US011270642B2

(12) United States Patent
Li et al.

(10) Patent No.: US 11,270,642 B2
(45) Date of Patent: Mar. 8, 2022

(54) PIXEL UNIT, DISPLAY PANEL, DRIVING METHOD THEREOF AND COMPENSATION CONTROL METHOD THEREOF

(71) Applicants: HEFEI XINSHENG OPTOELECTRONICS TECHNOLOGY CO., LTD., Anhui (CN); BOE TECHNOLOGY GROUP CO., LTD., Beijing (CN)

(72) Inventors: Meng Li, Beijing (CN); Yongqian Li, Beijing (CN); Song Meng, Beijing (CN); Zhidong Yuan, Beijing (CN); Can Yuan, Beijing (CN); Haixia Xu, Beijing (CN); Wenchao Bao, Beijing (CN)

(73) Assignees: HEFEI XINSHENG OPTOELECTRONICS TECHNOLOGY CO., LTD., Anhui (CN); BOE TECHNOLOGY GROUP CO., LTD., Beijing (CN)

( * ) Notice: Subject to any disclaimer, the term of this patent is extended or adjusted under 35 U.S.C. 154(b) by 44 days.

(21) Appl. No.: 16/674,531

(22) Filed: Nov. 5, 2019

(65) Prior Publication Data

US 2020/0202786 A1 Jun. 25, 2020

(30) Foreign Application Priority Data

Dec. 24, 2018 (CN) ........................ 201811582314.1

(51) Int. Cl.
*G06F 3/038* (2013.01)
*G09G 3/3258* (2016.01)

(52) U.S. Cl.
CPC ... *G09G 3/3258* (2013.01); *G09G 2300/0426* (2013.01); *G09G 2300/0439* (2013.01);
(Continued)

(58) Field of Classification Search
USPC .............. 345/205, 99, 82, 204, 207; 349/34; 257/40
See application file for complete search history.

(56) References Cited

U.S. PATENT DOCUMENTS

2007/0001938 A1 1/2007 Lee et al.
2007/0145903 A1 6/2007 Yui
(Continued)

FOREIGN PATENT DOCUMENTS

CN 1892765 A 1/2007
CN 101191931 A 6/2008
(Continued)

OTHER PUBLICATIONS

1st Chinese Office Action, English Translation.
(Continued)

*Primary Examiner* — Thuy N Pardo
(74) *Attorney, Agent, or Firm* — Brooks Kushman P.C.

(57) ABSTRACT

A pixel unit includes a first sub-pixel circuit and a second sub-pixel circuit. The first sub-pixel circuit includes a first sub-pixel driving circuit and a first light-emitting element, and the second sub-pixel circuit includes a second sub-pixel driving circuit and a second light-emitting element. The first sub-pixel driving circuit and the second sub-pixel driving circuit are connected to a first data line, and the first sub-pixel driving circuit is connected to a first gate line, the second sub-pixel driving circuit is connected to the second gate line. The first sub-pixel driving circuit is configured to drive the first light-emitting element by a data voltage on the first data line under the control of the first gate line. The second sub-pixel driving circuit is configured to drive the second light-emitting element by the data voltage on the first data line under the control of the second gate line.

17 Claims, 7 Drawing Sheets

(52) U.S. Cl.
CPC ............... *G09G 2300/0819* (2013.01); *G09G 2310/0202* (2013.01); *G09G 2310/0264* (2013.01)

(56) References Cited

U.S. PATENT DOCUMENTS

| | | | | |
|---|---|---|---|---|
| 2008/0129676 | A1* | 6/2008 | Kim | G09G 3/3614 345/99 |
| 2012/0062810 | A1* | 3/2012 | Lee | G02F 1/1362 349/34 |
| 2015/0243222 | A1* | 8/2015 | Lee | G09G 3/3291 345/82 |
| 2015/0364092 | A1* | 12/2015 | Kim | G09G 3/3233 345/205 |
| 2016/0300531 | A1* | 10/2016 | Yang | G09G 3/3291 |
| 2016/0380038 | A1* | 12/2016 | Kang | H01L 27/3246 257/40 |
| 2017/0104035 | A1* | 4/2017 | Lee | H01L 51/56 |
| 2017/0125506 | A1* | 5/2017 | Kim | H01L 27/3265 |
| 2017/0153510 | A1* | 6/2017 | Choi | G02F 1/133516 |
| 2017/0162116 | A1* | 6/2017 | Minami | H01L 27/3244 |
| 2017/0221419 | A1* | 8/2017 | Xiang | G09G 3/3233 |
| 2018/0012547 | A1* | 1/2018 | Li | H01L 27/323 |
| 2018/0083078 | A1* | 3/2018 | Park | H01L 51/102 |
| 2018/0137830 | A1* | 5/2018 | Lee | G09G 3/3614 |
| 2018/0138256 | A1* | 5/2018 | Han | G09G 3/3266 |
| 2018/0183008 | A1* | 6/2018 | Song | H01L 51/5271 |
| 2018/0190217 | A1* | 7/2018 | Jung | G09G 3/3607 |
| 2018/0286332 | A1* | 10/2018 | Ma | G09G 3/3614 |
| 2019/0073963 | A1* | 3/2019 | Yang | G09G 3/3266 |
| 2019/0088180 | A1* | 3/2019 | Cai | G09G 3/3225 |
| 2019/0108791 | A1* | 4/2019 | Takahara | H01L 27/127 |
| 2019/0278407 | A1 | 9/2019 | Ma | |
| 2019/0302815 | A1* | 10/2019 | Tanaka | H01L 27/124 |
| 2019/0371245 | A1 | 12/2019 | Yuan et al. | |
| 2020/0175249 | A1* | 6/2020 | Kim | G09G 3/3275 |
| 2020/0274025 | A1* | 8/2020 | Wang | G02F 1/133514 |

FOREIGN PATENT DOCUMENTS

| | | | |
|---|---|---|---|
| CN | 105845080 | A | 8/2016 |
| CN | 106531084 | A | 3/2017 |
| CN | 206163102 | U | 5/2017 |
| CN | 106952612 | A | 7/2017 |
| CN | 107086023 | A | 8/2017 |
| CN | 107452336 | A | 12/2017 |
| CN | 109166529 | A | 1/2019 |

OTHER PUBLICATIONS

CN1892765A, English Abstract and U.S. Equivalent U.S. Pub. No. 2007/0001938.
CN101191931A, English Abstract and U.S. Equivalent U.S. Pub. No. 2008/0129676.
CN105845080A, English Abstract and Machine Translation.
CN106531084A, English Abstract and U.S. Equivalent U.S. Pub. No. 2017/0221419.
CN106952612A, English Abstract and U.S. Equivalent U.S. Pub. No. 2019/0278407.
CN107086023A, English Abstract and U.S. Equivalent U.S. Pub. No. 2019/0371245.
CN107452336A, English Abstract and Machine Translation.
CN109166529A, English Abstract and Machine Translation.
CN206163102U, English Abstract and Machine Translation.
First Office Action for Chinese Application No. 201811582314.1, dated Feb. 21, 2020, 14 Pages.

* cited by examiner

PIXEL UNIT, DISPLAY PANEL, DRIVING METHOD THEREOF AND COMPENSATION CONTROL METHOD THEREOF

CROSS-REFERENCE TO RELATED APPLICATION

This application claims priority to Chinese Patent Application No. 201811582314.1 filed on Dec. 24, 2018, which is incorporated herein by reference in its entirety.

TECHNICAL FIELD

The present disclosure relates to the field of display technology, in particular to a pixel unit, a display panel, a method of driving the display panel and a compensation control method of the display panel.

BACKGROUND

In the current display field, high-resolution 8K AMOLED (Active-matrix organic light-emitting diode) display products are relatively rare, mainly due to the difficulty of the process, limited pixel layout space and high production cost.

The number of data lines and external compensation lines in the pixel structure adopted by an existing display panel is large, which is disadvantageous for reducing the pixel layout space and achieving high resolution. Moreover, since the number of data lines used in the existing display panel is large, the number of source drivers is also large, resulting in high manufacturing cost.

SUMMARY

In one aspect, the present disclosure provides in some embodiments a pixel unit, comprising a first sub-pixel circuit and a second sub-pixel circuit, wherein the first sub-pixel circuit comprises a first sub-pixel driving circuit and a first light-emitting element, and the second sub-pixel circuit comprises a second sub-pixel driving circuit and a second light-emitting element; the first sub-pixel driving circuit and the second sub-pixel driving circuit are connected to a first data line, and the first sub-pixel driving circuit is connected to a first gate line, the second sub-pixel driving circuit is connected to the second gate line; the first sub-pixel driving circuit is configured to drive the first light-emitting element by a data voltage on the first data line under the control of the first gate line; the second sub-pixel driving circuit is configured to drive the second light-emitting element by the data voltage on the first data line under the control of the second gate line.

Optionally, the pixel unit further includes a third sub-pixel circuit. The third sub-pixel circuit comprises a third sub-pixel driving circuit and a third light-emitting element, the third sub-pixel circuit is respectively connected to the first gate line and the second data line, and the third sub-pixel driving circuit is configured to drive the third light-emitting element to emit light by a data voltage on the second data line under the control of the first gate line.

Optionally, the first sub-pixel driving circuit includes a first data writing-in circuit, a first driving circuit, and a first external compensation detecting circuit; the second sub-pixel driving circuit comprises a second data writing-in circuit, a second driving circuit, and a second external compensation detecting circuit; and the third sub-pixel driving circuit comprises a third data writing-in circuit, a third driving circuit, and a third external compensation detecting circuit; the first external compensation detecting circuit, the second external compensation detecting circuit, and the third external compensation detecting circuit are all connected to the first external compensation line; the first external compensation detecting circuit and the third external compensation detecting circuit are both connected to the first gate line, and the second external compensation detecting circuit is connected to the second gate line; the first data writing-in circuit is connected to the first gate line and the first data line, respectively, and configured to write a data voltage at the first data line to the control end of the first driving circuit under the control of the first gate line; a first end of the first driving circuit is connected to a power voltage end, and a second end of the first driving circuit is connected to the first light-emitting element, the first driving circuit is configured to drive the first light-emitting element to emit light by the voltage at the control end of the first driving circuit; the first external compensation detecting circuit is connected to the second end of the first driving circuit, and configured to write the voltage at the second end of the first driving circuit to the first external compensation line under the control of the first gate line; the second external compensation detecting circuit is connected to the second end of the second driving circuit, and configured to write the voltage at the second end of the second driving circuit to the first external compensation line under the control of the second gate line; and the third external compensation detecting circuit is connected to the second end of the third driving circuit, and configured to write the voltage at the second end of the third driving circuit to the first external compensation line under the control of the first gate line.

Optionally, the first data writing-in circuit includes a first data writing-in transistor; the first driving circuit comprises a first driving transistor and a first storage capacitor; and the first external compensation detecting circuit comprises a first detecting transistor; a control electrode of the first data writing-in transistor is connected to the first gate line, a first electrode of the first data writing-in transistor is connected to the first data line, and a second electrode of the first data writing-in transistor is connected to the control electrode of the first driving transistor; a first electrode of the first driving transistor is connected to the power voltage terminal, and a second electrode of the first driving transistor is connected to the first light-emitting element; a first end of the first storage capacitor is connected to a control electrode of the first driving transistor, and a second end of the first storage capacitor is connected to a second electrode of the first driving transistor; a control electrode of the first detecting transistor is connected to the first gate line, a first electrode of the first detecting transistor is connected to a second electrode of the first driving transistor, and a second electrode of the first detecting transistor is connected to the first external compensation line.

Optionally, the second data writing-in circuit includes a second data writing-in transistor; the second driving circuit comprises a second driving transistor and a second storage capacitor; and the second external compensation detecting circuit comprises a second detecting transistor; a control electrode of the second data writing-in transistor is connected to the second gate line, a first electrode of the second data writing-in transistor is connected to the first data line, and a second electrode of the second data writing-in transistor is connected to a control electrode of the second driving transistor; a first electrode of the second driving transistor is connected to the power voltage terminal, and a second electrode of the second driving transistor is connected to the second light-emitting element; a first end of the second storage capacitor is connected to a control electrode of the second driving transistor, and a second end of the second storage capacitor is connected to a second electrode of the second driving transistor; a control electrode of the second detecting transistor is connected to the second gate line, a first electrode of the second detecting transistor is connected to a second electrode of the second driving transistor, and a second electrode of the second detecting transistor is connected to the first external compensation line.

Optionally, the third data writing-in circuit includes a third data writing-in transistor; the third driving circuit comprises a third driving transistor and a third storage capacitor; and the third external compensation detecting circuit comprises a third detecting transistor; a control electrode of the third data writing-in transistor is connected to the first gate line, a first electrode of the third data writing-in transistor is connected to the second data line, and a second electrode of the third data writing-in transistor is connected to a control electrode of the third driving transistor; a first electrode of the third driving transistor is connected to the power voltage terminal, and a second electrode of the third driving transistor is connected to the third light-emitting element; a first end of the third storage capacitor is connected to a control electrode of the third driving transistor, and a second end of the third storage capacitor is connected to a second electrode of the third driving transistor; a control electrode of the third detecting transistor is connected to the first gate line, a first electrode of the third detecting transistor is connected to a second electrode of the third driving transistor, and a second electrode of the third detecting transistor is connected to the first external compensation line.

Optionally, the first light-emitting element is a first organic light emitting diode, the second light-emitting element is a second organic light emitting diode, and the third light-emitting element is a third organic light emitting diode.

In another aspect, a display panel includes the above pixel unit.

In yet another aspect, a display panel includes a pixel structure, the pixel structure includes two above pixel units, the two pixel units comprise a first pixel unit and a second pixel unit; a first sub-pixel driving circuit in the first pixel unit is respectively connected to the first gate line and the first data line; a second sub-pixel driving circuit in the first pixel unit is respectively connected to the second gate line and the first data line; a third sub-pixel driving circuit in the first pixel unit is respectively connected to the first gate line and the second data line; a first sub-pixel driving circuit in the second pixel unit is respectively connected to the second gate line and the second data line; a second sub-pixel driving circuit in the second pixel unit is respectively connected to the first gate line and the third data line; and the third sub-pixel driving circuit in the second pixel unit is respectively connected to the second gate line and the third data line.

Optionally the first sub-pixel driving circuit in the first pixel unit comprises a first external compensation detecting circuit, a first data writing-in circuit, and a first driving circuit; the second sub-pixel driving circuit in the first pixel unit comprises a second external compensation detecting circuit, a second data writing-in circuit, and a second driving circuit; and the third sub-pixel driving circuit in the first pixel unit comprises a third external compensation detecting circuit, a third data writing-in circuit, and a third driving circuit; a first sub-pixel driving circuit in the second pixel unit comprises a fourth external compensation detecting circuit, a fourth data writing-in circuit, and a fourth driving circuit; a second sub-pixel driving circuit in the second pixel unit comprises a fifth external compensation detecting circuit, a fifth data writing-in circuit and a fifth driving circuit; the third sub-pixel driving circuit in the second pixel unit comprises a sixth external compensation detecting circuit, a sixth data writing-in circuit and a sixth driving circuit; the first external compensation detecting circuit, the second external compensation detecting circuit and the third external compensation detecting circuit are all connected to the first external compensation line; and the fourth external compensation detecting circuit, the fifth external compensation detecting circuit, and the sixth external compensation detecting circuit are all connected to the second external compensation line.

In still yet another aspect, a method of driving the display panel includes: a display time period comprising a first display period and a second display period; in the first display period, the first data line outputting a first data voltage, the second data line outputting a second data voltage, and the third data line outputting a third data voltage, under the control of the first gate line, a first sub-pixel driving circuit of the first pixel unit driving a first light-emitting element of the first pixel unit according to the first data voltage, and a third sub-pixel driving circuit of the first pixel unit driving a third light-emitting element of the first pixel unit according to the second data voltage, and a second sub-pixel driving circuit of the second pixel unit driving a second light-emitting element of the second pixel unit according to the third data voltage; in the second display period, the first data line outputting a fourth data voltage, the second data line outputting a fifth data voltage, and the third data line outputting a sixth data voltage, under the control of the second gate line, a second sub-pixel driving circuit in the first pixel unit driving a second light-emitting element of the first pixel unit according to the fourth data voltage, a first sub-pixel driving circuit of the second pixel unit driving the first light-emitting element of the second pixel unit according to the fifth data voltage, and the third sub-pixel driving circuit of the second pixel unit driving the third light-emitting element of the second pixel unit according to the sixth data voltage.

Optionally, the first sub-pixel driving circuit of the first pixel unit includes a first data writing-in circuit and a first driving circuit; and the second sub-pixel driving circuit of the first pixel unit comprises a second data writing-in circuit and a second driving circuit; the third sub-pixel driving circuit of the first pixel unit comprises a third data writing-in circuit and a third driving circuit; and the first sub-pixel driving circuit of the second pixel unit comprises a fourth data writing-in circuit and a fourth driving circuit; the second sub-pixel driving circuit of the second pixel unit comprises a fifth data writing-in circuit and a fifth driving circuit; and a third sub-pixel driving circuit of the second pixel unit comprises a sixth data writing-in circuit and a sixth driving circuit, the first display period comprises a first display phase, a third display phase, and a fifth display phase; and the second display period comprises a second display phase, a fourth display phase and a sixth display phase; the method includes: in the first display phase, the first data line outputting the first data voltage, and under the control of the first gate line, the first data writing-in circuit writing the first data voltage to the control end of the first driving circuit, the first driving circuit driving the first light-emitting element of the first pixel unit according to the voltage at the control end of the first driving circuit; in the second display phase, the second data line outputting the fifth data voltage, and under the control of the second gate line, the fourth data writing-in circuit writing the fifth data voltage to the control end of the fourth driving circuit, the fourth driving circuit driving the first light-emitting element of the second pixel unit according to the voltage at the control end of the fourth driving circuit; in the third display phase, the third data line outputting the third data voltage, and under the control of the first gate line, the fifth data writing-in circuit writing the third data voltage to the control end of the fifth driving circuit, the fifth driving circuit driving the second light-emitting element of the second pixel unit according to the voltage at the control end of the fifth driving circuit; in the fourth display phase, the first data line outputting the fourth data voltage, and under the control of the second gate line, the second data writing-in circuit writing the fourth data voltage to the control end of the second driving circuit, the second driving circuit driving the second light-emitting element of the first pixel unit according to the voltage at the control end of the second driving circuit; in the fifth display phase, the second data line outputting a second data voltage, and under the control of the first gate line, the third data writing-in circuit writing the second data voltage to a control end of the third driving circuit, the third driving circuit driving the third light-emitting element of the first pixel unit according to a voltage at the control end of the third driving circuit; in the sixth display phase, the third data line outputting a sixth data voltage, and under the control of the second gate line, the sixth data writing-in circuit writing the sixth data voltage to a control end of the sixth driving circuit, the sixth driving circuit drives the third light-emitting element of the second pixel unit according to the voltage at the control end of the sixth driving circuit.

In still yet another aspect, a compensation control method for the display panel includes: an external compensation control period including six external compensation control phases; in a (2n−1)th external compensation control phase, an nth data line outputting a (2n−1)th data voltage, and under the control of the first gate line, a (2n−1)th data writing-in circuit writing the (2n−1)th data voltage to a control end of a (2n−1)th driving circuit, a (2n−1)th external compensation detecting circuit writing a voltage at a second end of the (2n−1)th driving circuit to a first external compensation line; in a 2nth external compensation control period, an nth data line outputting a 2nth data voltage, and under the control of the second gate line, a 2nth data writing-in circuit writing the 2nth data voltage to a control end of a 2nth driving circuit, a 2nth external compensation detecting circuit writing a voltage at a second end of the 2nth driving circuit to a second external compensation line; n is a positive integer less than or equal to 3.

In still yet another aspect, a compensation control method of the display panel includes: in an external compensation control period, the first data line outputting the first data voltage, and under the control of the first gate line, the first data writing-in circuit writing the first data voltage to the control end of the first driving circuit, the first external compensation detecting circuit writing the voltage at the second end of the first driving circuit to the first external compensation line, the third data line outputting the fifth data voltage, under the control of the first gate line, the fifth data writing-in circuit writing the fifth data voltage to the control end of the fifth driving circuit, and the fifth external compensation detecting circuit writing the voltage at the second end of the fifth driving circuit to the second external compensation line; in the external compensation control period, the second data line outputting a turn-off control voltage, and under the control of the first gate line, the third data writing-in circuit writing the turn-off control voltage to the control end of the third driving circuit to disconnect the first end and the second end of the third driving circuit.

In still yet another aspect, a compensation control method of the display panel includes: in an external compensation control period, the second data line outputting the third data voltage, and under the control of the first gate line, the third data writing-in circuit writing the third data voltage to the control end of the third driving circuit, the third external compensation detecting circuit writing the voltage at the second end of the third driving circuit to the first external compensation line, the third data line outputting the fifth data voltage, under the control of the first gate line, the fifth data writing-in circuit writing the fifth data voltage to the control end of the fifth driving circuit, and the fifth external compensation detecting circuit writing the voltage at the second end of the fifth driving circuit to the second external compensation line; in the external compensation control period, the first data line outputting a turn-off control voltage, and under the control of the first gate line, the first data writing-in circuit writing the turn-off control voltage to the control end of the first driving circuit to disconnect the first end and the second end of the first driving circuit.

In still yet another aspect, a compensation control method of the display panel includes: in an external compensation control period, the first data line outputting the second data voltage, and under the control of the second gate line, the second data writing-in circuit writing the second data voltage to the control end of the second driving circuit, the second external compensation detecting circuit writing the voltage at the second end of the second driving circuit to the first external compensation line, the second data line outputting the fourth data voltage, under the control of the second gate line, the fourth data writing-in circuit writing the fourth data voltage to the control end of the fourth driving circuit, and the fourth external compensation detecting circuit writing the voltage at the second end of the fourth driving circuit to the second external compensation line; in the external compensation control period, the third data line outputting a turn-off control voltage, and under the control of the second gate line, the sixth data writing-in circuit writing the turn-off control voltage to the control end of the sixth driving circuit to disconnect the first end and the second end of the sixth driving circuit.

In still yet another aspect, a compensation control method of the display panel includes: in an external compensation control period, the first data line outputting the second data voltage, and under the control of the second gate line, the second data writing-in circuit writing the second data voltage to the control end of the second driving circuit, the second external compensation detecting circuit writing the voltage at the second end of the second driving circuit to the first external compensation line, the third data line outputting the sixth data voltage, under the control of the second gate line, the sixth data writing-in circuit writing the sixth data voltage to the control end of the sixth driving circuit, and the sixth external compensation detecting circuit writing the voltage at the second end of the sixth driving circuit to the second external compensation line; in the external compensation control period, the second data line outputting a turn-off control voltage, and under the control of the second gate line, the fourth data writing-in circuit writing the turn-off control voltage to the control end of the fourth driving circuit to disconnect the first end and the second end of the fourth driving circuit.

DETAILED DESCRIPTION

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

All transistors adopted in the embodiments of the present disclosure may be triodes, thin film transistors (TFTs), field effect transistors (FETs) or any other elements having an identical characteristic. In order to differentiate two electrodes other than a control electrode from each other, one of the two electrodes is called as first electrode and the other is called as second electrode.

In actual use, when the transistor is a triode, the control electrode may be a base, the first electrode may be a collector, and the second electrode may be an emitter, or the control electrode may be a base, the first electrode may be an emitter, and the second electrode may be a collector.

In actual use, when the transistor is a TFT or FET, the control electrode may be a gate electrode, the first electrode may be a drain electrode and the second electrode may be a source electrode, or the control electrode may be a gate electrode, the first electrode may be a source electrode and the second electrode may be a drain electrode.

Figure 1:
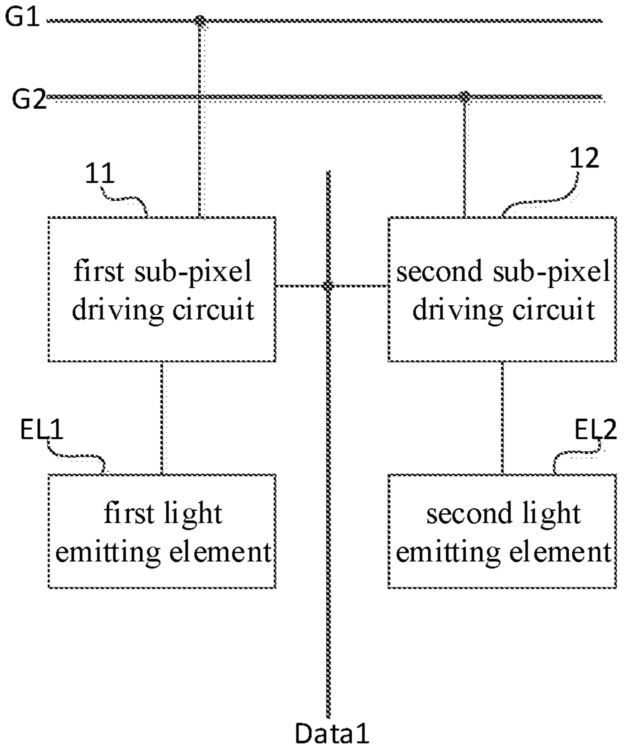
FIG. 1 is a schematic diagram of a pixel unit according to an embodiment of the present disclosure.

As shown in FIG. 1, a pixel unit according to an embodiment of the present disclosure includes a first sub-pixel circuit and a second sub-pixel circuit. The first sub-pixel circuit includes a first sub-pixel driving circuit 11 and a first light-emitting element EL1, and the second sub-pixel circuit includes a second sub-pixel driving circuit 12 and a second light-emitting element EL2. The first sub-pixel driving circuit 11 and the second sub-pixel driving circuit 12 are connected to a first data line Data1, and the first sub-pixel driving circuit 11 is connected to a first gate line G1, the second sub-pixel driving circuit 12 is connected to the second gate line G2. The first sub-pixel driving circuit 11 is configured to drive the first light-emitting element EL1 by a data voltage on the first data line Data1 under the control of the first gate line G1. The second sub-pixel driving circuit 12 is configured to drive the second light-emitting element EL2 by the data voltage on the first data line Data1 under the control of the second gate line G2.

In the pixel unit of the embodiment of the present disclosure, two sub-pixel driving circuits share one data line, thereby reducing the number of data lines, reducing a pixel layout space, achieving high resolution in a limited space, reducing the number of source drivers and reducing the product cost.

In a specific implementation, the first sub-pixel driving circuit 11 drives EL1 to emit light by a data voltage on Data1 in a corresponding display stage, and the second sub-pixel driving circuit 12 drives EL2 to emit light by the data voltage on Data1 in a corresponding display stage.

In a specific implementation, the light-emitting element included in the sub-pixel circuit may be an organic light-emitting diode, but is not limited thereto.

Figure 2:
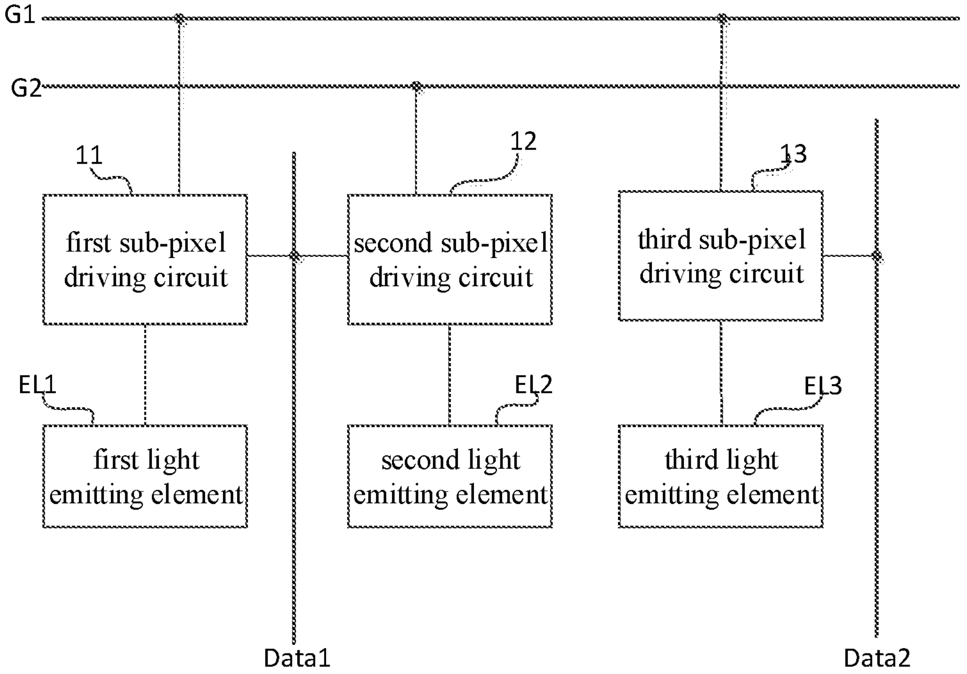
FIG. 2 is another schematic diagram of a pixel unit according to an embodiment of the present disclosure.

As shown in FIG. 2, on the basis of the pixel unit shown in FIG. 1, the pixel unit may further include a third sub-pixel circuit. The third sub-pixel circuit includes a third sub-pixel driving circuit 13 and a third light-emitting element EL3. The third sub-pixel circuit 13 is respectively connected to the first gate line G1 and the second data line Data2, and the third sub-pixel driving circuit 13 is configured to drive the third light-emitting element EL3 to emit light by a data voltage on the second data line Data2 under the control of the first gate line G1.

In actual operation, the third sub-pixel driving circuit 13 drives the EL3 to emit light by the data voltage on Data2 in the corresponding display period.

In a specific implementation, the pixel unit may further include a third sub-pixel circuit. For example, the first sub-pixel circuit may be a red sub-pixel circuit, the second sub-pixel circuit may be a green sub-pixel circuit, and the third sub-pixel circuit may be a blue sub-pixel circuit, but is not limited thereto.

Figure 3:
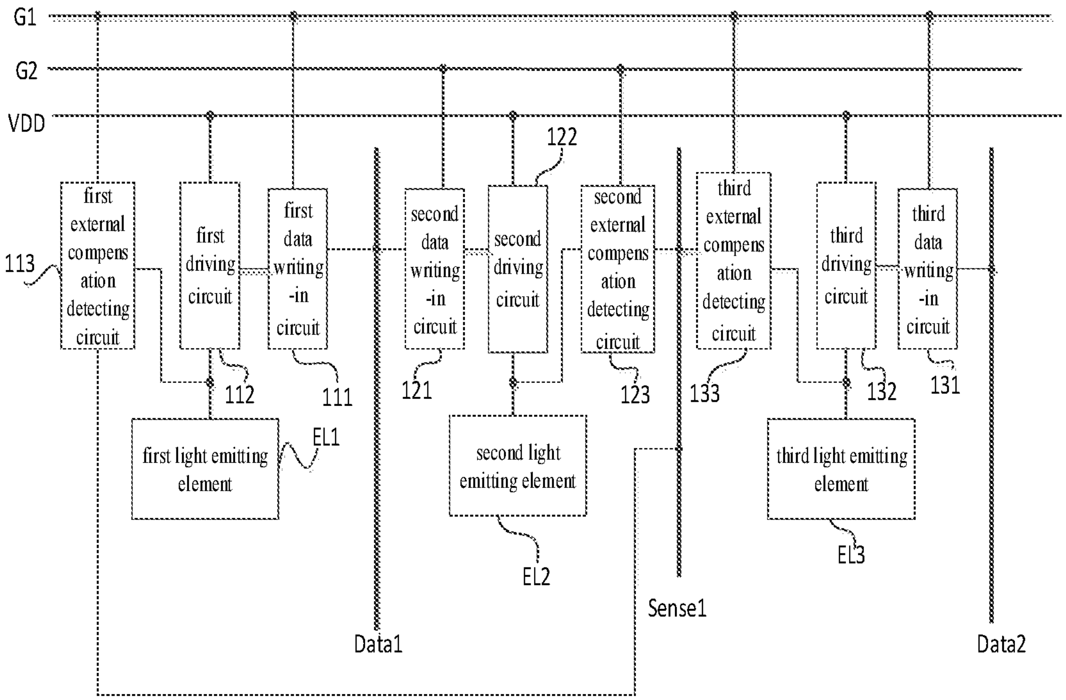
FIG. 3 is yet another schematic diagram of a pixel unit according to an embodiment of the present disclosure.

Specifically, as shown in FIG. 3, the first sub-pixel driving circuit may include a first data writing-in circuit 111, a first driving circuit 112, and a first external compensation detecting circuit 113. The second sub-pixel driving circuit may include a second data writing-in circuit 121, a second driving circuit 122, and a second external compensation detecting circuit 123. The third sub-pixel driving circuit may include a third data writing-in circuit 131, a third driving circuit 132, and a third external compensation detecting circuit 133. The first external compensation detecting circuit 113, the second external compensation detecting circuit 123, and the third external compensation detecting circuit 133 are all connected to the first external compensation line Sense1. The first external compensation detecting circuit 113 and the third external compensation detecting circuit 133 are both connected to the first gate line G1, and the second external compensation detecting circuit 123 is connected to the second gate line G2. The first data writing-in circuit 111 is connected to the first gate line G1 and the first data line Data1, respectively, and configured to write a data voltage at the first data line Data1 to the control end of the first driving circuit 112 under the control of the first gate line G1. A first end of the first driving circuit 112 is connected to a power voltage end for inputting a power supply voltage VDD, and a second end of the first driving circuit 112 is connected to the first light-emitting element EL1, the first driving circuit 112 is configured to drive the first light-emitting element EL1 to emit light by the voltage at the control end of the first driving circuit. The first external compensation detecting circuit 113 is connected to the second end of the first driving circuit 112, and configured to write the voltage of the second end of the first driving circuit 112 to the first external compensation line Sense1 under the control of the first gate line G1. The second external compensation detecting circuit 123 is connected to the second end of the second driving circuit 122, and configured to write the voltage at the second end of the second driving circuit 122 to the first external compensation line Sense1 under the control of the second gate line G2. The third external compensation detecting circuit 133 is connected to the second end of the third driving circuit 132, and configured to write the voltage at the second end of the third driving circuit 132 to the first external compensation line Sense1 under the control of the first gate line G1.

Optionally, the first external compensation detecting circuit 113, the second external compensation detecting circuit 123, and the third external compensation detecting circuit 133 are all connected to the first external compensation line Sense1. The first sub-pixel circuit, the second sub-pixel circuit and the third sub-pixel circuit share one external compensation line, thereby reducing the number of external compensation lines, reducing the pixel layout space, and achieving high resolution.

In a specific implementation, the first data writing-in circuit may include a first data writing-in transistor; the first driving circuit may include a first driving transistor and a first storage capacitor; and the first external compensation detecting circuit may include a first detecting transistor. A control electrode of the first data writing-in transistor is connected to the first gate line, a first electrode of the first data writing-in transistor is connected to the first data line, and a second electrode of the first data writing-in transistor is connected to the control electrode of the first driving transistor. A first electrode of the first driving transistor is connected to the power voltage terminal, and a second electrode of the first driving transistor is connected to the first light-emitting element. A first end of the first storage capacitor is connected to a control electrode of the first driving transistor, and a second end of the first storage capacitor is connected to a second electrode of the first driving transistor. A control electrode of the first detecting transistor is connected to the first gate line, a first electrode of the first detecting transistor is connected to a second electrode of the first driving transistor, and a second electrode of the first detecting transistor is connected to the first external compensation line.

Specifically, the second data writing-in circuit may include a second data writing-in transistor; the second driving circuit may include a second driving transistor and a second storage capacitor; and the second external compensation detecting circuit may include a second detecting transistor. A control electrode of the second data writing-in transistor is connected to the second gate line, a first electrode of the second data writing-in transistor is connected to the first data line, and a second electrode of the second data writing-in transistor is connected to a control electrode of the second driving transistor. A first electrode of the second driving transistor is connected to the power voltage terminal, and a second electrode of the second driving transistor is connected to the second light-emitting element. A first end of the second storage capacitor is connected to a control electrode of the second driving transistor, and a second end of the second storage capacitor is connected to a second electrode of the second driving transistor. A control electrode of the second detecting transistor is connected to the second gate line, a first electrode of the second detecting transistor is connected to a second electrode of the second driving transistor, and a second electrode of the second detecting transistor is connected to the first external compensation line.

Specifically, the third data writing-in circuit may include a third data writing-in transistor; the third driving circuit may include a third driving transistor and a third storage capacitor; and the third external compensation detecting circuit may include a third detecting transistor. A control electrode of the third data writing-in transistor is connected to the first gate line, a first electrode of the third data writing-in transistor is connected to the second data line, and a second electrode of the third data writing-in transistor is connected to the control electrode of the third driving transistor. A first electrode of the third driving transistor is connected to the power voltage terminal, and a second electrode of the third driving transistor is connected to the third light-emitting element. A first end of the third storage capacitor is connected to a control electrode of the third driving transistor, and a second end of the third storage capacitor is connected to a second electrode of the third driving transistor. A control electrode of the third detecting transistor is connected to the first gate line, a first electrode of the third detecting transistor is connected to a second electrode of the third driving transistor, and a second electrode of the third detecting transistor is connected to the first external compensation line.

Figure 4:
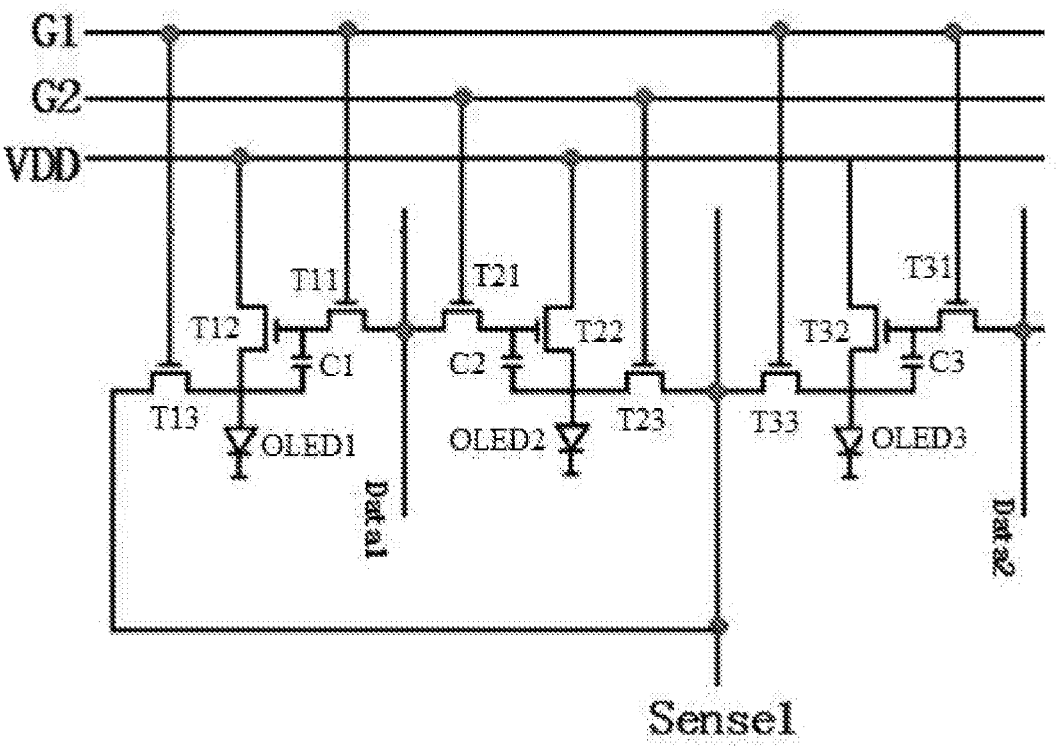
FIG. 4 is a circuit diagram of a pixel unit according to an embodiment of the present disclosure.

As shown in FIG. 4, on the basis of the pixel unit shown in FIG. 3, the first light-emitting element is the first organic light emitting diode OLED1, the second light-emitting element is the second organic light emitting diode OLED2, and the third light-emitting element is a third organic light emitting diode OLED3.

The first data writing-in circuit includes a first data writing-in transistor T11; the first driving circuit includes a first driving transistor T12 and a first storage capacitor C1; and the first external compensation detecting circuit includes a first detecting transistor T13. A gate electrode of the first data writing-in transistor T11 is connected to the first gate line G1, a drain electrode of the first data writing-in transistor T11 is connected to the first data line Data1, and the source electrode of the first data writing-in transistor T11 is connected to a gate electrode of the first driving transistor T12. A drain electrode of the first driving transistor T12 is connected to a power supply voltage terminal for inputting power supply voltage VDD, a source electrode of the first driving transistor T12 is connected to an anode of the first organic light emitting diode OLED1, and a cathode of the OLED1 is grounded.

The first end of the first storage capacitor C1 is connected to the gate electrode of the first driving transistor T12, and the second end of the first storage capacitor C1 is connected to the source electrode of the first driving transistor T12. A gate electrode of the first detecting transistor T13 is connected to the first gate line G1, a drain electrode of the first detecting transistor T13 is connected to a source electrode of the first driving transistor T12, and a drain electrode of the first detecting transistor T13 is connected to the first external compensation line Sense1.

The second data writing-in circuit includes a second data writing-in transistor T21; the second driving circuit includes a second driving transistor T22 and a second storage capacitor C2; and the second external compensation detecting circuit includes a second detecting transistor T23. A gate electrode of the second data writing-in transistor T21 is connected to the second gate line G2, a drain electrode of the second data writing-in transistor T21 is connected to the first data line Data1, and a source electrode of the second data writing-in transistor T21 is connected to a gate electrode of the second driving transistor T22. A drain electrode of the second driving transistor T22 is connected to the power supply voltage terminal for inputting power supply voltage VDD, the source electrode of the second driving transistor T22 is connected to the anode of the second organic light emitting diode OLED2, and the cathode of the OLED2 is grounded.

The first end of the second storage capacitor C2 is connected to the gate electrode of the second driving transistor T22, and the second end of the second storage capacitor C2 is connected to the source electrode of the second driving transistor T22. A gate electrode of the second detecting transistor T23 is connected to the second gate line G2, a drain electrode of the second detecting transistor T23 is connected to a source electrode of the second driving transistor T22, and a source electrode of the second detecting transistor T23 is connected to the first external compensation line Sense1.

The third data writing-in circuit includes a third data writing-in transistor T31; the third driving circuit includes a third driving transistor T32 and a third storage capacitor C3; and the third external compensation detecting circuit includes a third detecting transistor T33. A gate electrode of the third data writing-in transistor T31 is connected to the first gate line G1, a drain electrode of the third data writing-in transistor T31 is connected to a second data line Data2, and a source electrode of the third data writing-in transistor T31 is connected to a gate electrode of the third driving transistor T32. The drain electrode of the third driving transistor T32 is connected to the power supply voltage terminal for inputting power supply voltage VDD, the source electrode of the third driving transistor T32 is connected to the anode of the third organic light emitting diode OLED3, and the cathode of the OLED3 is grounded.

A first end of the third storage capacitor C3 is connected to a gate electrode of the third driving transistor T32, and a second end of the third storage capacitor C3 is connected to a source electrode of the third driving transistor T32. A gate electrode of the third detecting transistor T33 is connected to the first gate line G1, a drain electrode of the third detecting transistor T33 is connected to a source electrode of the third driving transistor T32, and a source electrode of the third detecting transistor T33 is connected to the first external compensation line Sense1.

In the specific implementation, the cathode of each organic light emitting diode can also be connected to a low voltage or a negative voltage, but not limited thereto.

In the specific embodiment of the pixel unit shown in FIG. 4, the three sub-pixel circuits share the first external compensation line Sense1, which can reduce the number of external compensation lines, reduce the pixel layout space, and achieve high resolution.

In the specific embodiment of the pixel unit shown in FIG. 4, all of the transistors are n-type transistors, but not limited thereto.

The display panel according to the embodiment of the present disclosure includes the above pixel unit.

In a specific implementation, the display panel includes a display substrate, and the pixel unit may be disposed on the display substrate.

The display panel provided by the embodiments of the present disclosure may be any product or component having a display function, such as a mobile phone, a tablet computer, a television, a display, a notebook computer, a digital photo frame, a navigator, and the like.

The display panel of the present disclosure includes a pixel structure, the pixel structure includes two pixel units, and the pixel unit includes a first sub-pixel circuit, a second sub-pixel circuit, and a third sub-pixel circuit. A first sub-pixel driving circuit in the first pixel unit is respectively connected to the first gate line and the first data line; a second sub-pixel driving circuit in the first pixel unit is respectively connected to the second gate line and the first data line; a third sub-pixel driving circuit in the first pixel unit is respectively connected to the first gate line and the second data line; a first sub-pixel driving circuit in the second pixel unit is respectively connected to the second gate line and the second data line; a second sub-pixel driving circuit in the second pixel unit is respectively connected to the first gate line and the third data line; the third sub-pixel driving circuit in the second pixel unit is respectively connected to the second gate line and the third data line.

The pixel structure in the display panel according to the embodiment of the present disclosure includes two pixel units, each pixel unit includes three sub-pixel circuits, and two adjacent sub-pixel circuits share one data line. As compared with the existing pixel structure, the pixel structure in the display panel of the embodiment of the present disclosure only needs to use three data lines, thereby reducing the number of data lines, reducing the pixel layout space, achieving high resolution in the limited space, reducing the number of source drivers and reducing the product cost.

The pixel structure provided by the embodiment of the present disclosure may be a high-resolution 8K active-matrix organic light-emitting diode (AMOLED) pixel structure adopting a top gate process and a top emission technology.

Figure 5:
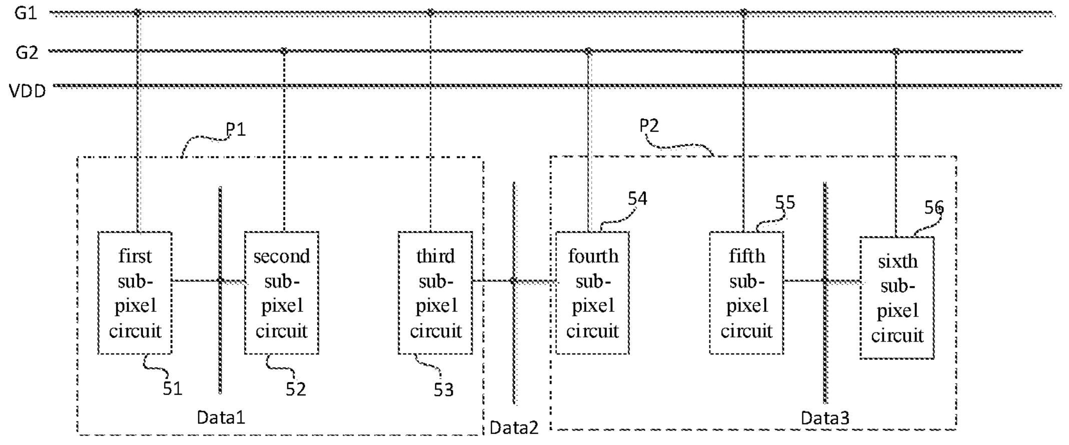
FIG. 5 is a schematic diagram of a pixel structure included in a display panel according to an embodiment of the present disclosure.

As shown in FIG. 5, a pixel structure in a display panel according to the present disclosure includes a first pixel unit P1 and a second pixel unit P2. The first pixel unit P1 includes a first sub-pixel circuit 51, a second sub-pixel circuit 52, and a third sub-pixel circuit 53. The second pixel unit P2 includes a fourth sub-pixel circuit 54, a fifth sub-pixel circuit 55 and a sixth sub-pixel circuit 56. The first sub-pixel circuit 51, the third sub-pixel circuit 53, and the fifth sub-pixel circuit 55 are all connected to the first gate line G1. The second sub-pixel circuit 52, the fourth sub-pixel circuit 54, and the sixth sub-pixel circuit 56 are all connected to the second gate line G2. The first sub-pixel circuit 51 and the second sub-pixel circuit 52 are both connected to the first data line Data1. The third sub-pixel circuit 53 and the fourth sub-pixel circuit 54 are both connected to the second data line Data2. The fifth sub-pixel circuit 55 and the sixth sub-pixel circuit 56 are both connected to the third data line Data3.

In the embodiment of the pixel structure shown in FIG. 5, the first sub-pixel circuit 51 and the second sub-pixel circuit 52 share the first data line Data1; the third sub-pixel circuit 53 and the fourth sub-pixel circuit 54 share the second data line Data2; the fifth sub-pixel circuit 55 and the sixth sub-pixel circuit 56 share the third data line Data3. The number of data lines can be reduced, the pixel layout space can be reduced, and high resolution can be realized, the number of source drivers may be reduced and the production cost may be reduced.

Specifically, the first sub-pixel driving circuit in the first pixel unit includes a first external compensation detecting circuit, a first data writing-in circuit, and a first driving circuit. The second sub-pixel driving circuit in the first pixel unit includes a second external compensation detecting circuit, a second data writing-in circuit, and a second driving circuit. The third sub-pixel driving circuit in the first pixel unit includes a third external compensation detecting circuit, a third data writing-in circuit, and a third driving circuit.

The first sub-pixel driving circuit in the second pixel unit includes a fourth external compensation detecting circuit, a fourth data writing-in circuit, and a fourth driving circuit. The second sub-pixel driving circuit in the second pixel unit includes a fifth external compensation detecting circuit, a fifth data writing-in circuit and a fifth driving circuit; the third sub-pixel driving circuit in the second pixel unit comprises a sixth external compensation detecting circuit, a sixth data writing-in circuit and a sixth driving circuit. The first external compensation detecting circuit, the second external compensation detecting circuit and the third external compensation detecting circuit are all connected to the first external compensation line. The fourth external compensation detecting circuit, the fifth external compensation detecting circuit, and the sixth external compensation detecting circuit are all connected to the second external compensation line.

Optionally, three sub-pixel circuits in the first pixel unit share one external compensation line, and three sub-pixel circuits in the second pixel unit share one external compensation line to reduce the number of the external compensation lines.

Figure 6:
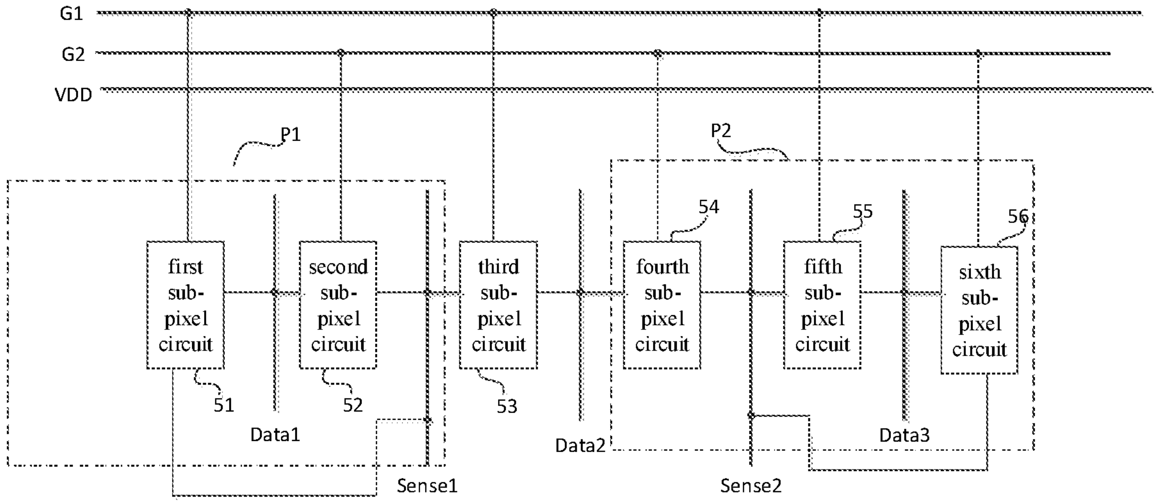
FIG. 6 is another schematic diagram of a pixel structure included in a display panel according to an embodiment of the present disclosure.

As shown in FIG. 6, a pixel structure in a display panel according to the present disclosure includes a first pixel unit P1 and a second pixel unit P2. The first pixel unit P1 includes a first sub-pixel circuit 51, a second sub-pixel circuit 52, and a third sub-pixel circuit 53. The second pixel unit P2 includes a fourth sub-pixel circuit 54, a fifth sub-pixel circuit 55 and a sixth sub-pixel circuit 56. The first sub-pixel circuit 51, the third sub-pixel circuit 53, and the fifth sub-pixel circuit 55 are all connected to the first gate line G1. The second sub-pixel circuit 52, the fourth sub-pixel circuit 54, and the sixth sub-pixel circuit 56 are all connected to the second gate line G2. The first sub-pixel circuit 51 and the second sub-pixel circuit 52 are both connected to the first data line Data1. The third sub-pixel circuit 53 and the fourth sub-pixel circuit 54 are both connected to the second data line Data2. The fifth sub-pixel circuit 55 and the sixth sub-pixel circuit 56 are both connected to the third data line Data3. The first sub-pixel circuit 51, the second sub-pixel circuit 52, and the third sub-pixel circuit 53 are all connected to the first external detecting line Sense1. The fourth sub-pixel circuit 54, the fifth sub-pixel circuit 55, and the sixth sub-pixel circuit 56 are all connected to the second external detecting line Sense2.

In the embodiment of the pixel structure shown in FIG. 6, the first sub-pixel circuit 51 and the second sub-pixel circuit 52 share the first data line Data1; the third sub-pixel circuit 53 and the fourth sub-pixel circuit 54 share the second data line Data2; the fifth sub-pixel circuit 55 and the sixth sub-pixel circuit 56 share the third data line Data3. The first sub-pixel circuit 51, the second sub-pixel circuit 52 and the third sub-pixel circuit 53 share a first external compensation line Sense1, and the fourth sub-pixel circuit 54, the fifth sub-pixel circuit 55 and the sixth sub-pixel circuit 56 share a second external compensation line Sense2. The number of data lines and the number of external compensation lines can be reduced, the pixel layout space can be reduced, high resolution can be realized, the number of source drivers can be reduced, and the production cost can be reduced.

Figure 7:
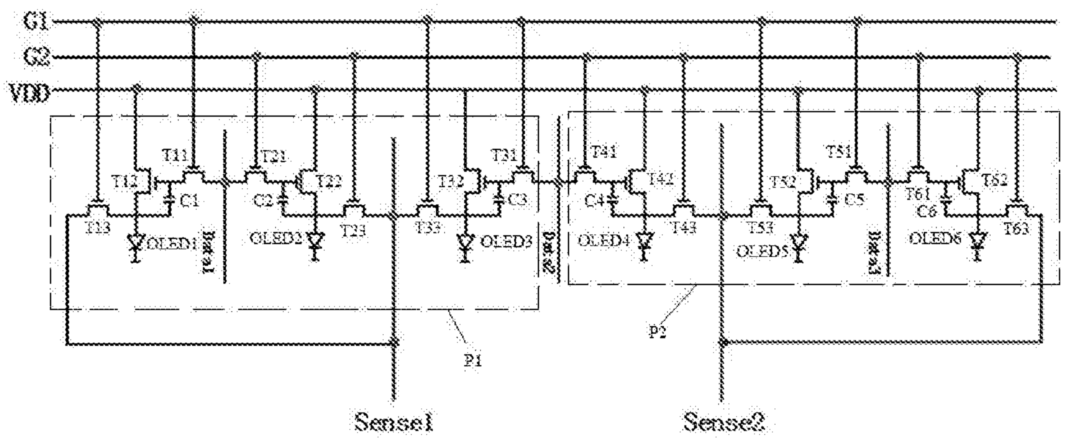
FIG. 7 is a circuit diagram of a pixel structure included in a display panel according to an embodiment of the present disclosure.

As shown in FIG. 7, a specific embodiment of a pixel structure in a display panel according to the present disclosure includes a first pixel unit and a second pixel unit; the first pixel unit includes a first sub-pixel circuit and a second sub-pixel circuit and a third sub-pixel circuit; the second pixel unit P2 includes a fourth sub-pixel circuit, a fifth sub-pixel circuit, and a sixth sub-pixel circuit.

The first sub-pixel circuit includes a first sub-pixel driving circuit and a first organic light emitting diode OLED1; the second sub-pixel circuit includes a second sub-pixel driving circuit and a second organic light emitting diode OLED2; the third sub-pixel circuit includes a third sub-pixel driving circuit and a third organic light emitting diode OLED3; the fourth sub-pixel circuit includes a fourth sub-pixel driving circuit and a fourth organic light emitting diode OLED4; the fifth sub-pixel circuit includes a fifth sub-pixel driving circuit and a fifth organic light emitting diode OLED5; and a sixth sub-pixel circuit includes a sixth sub-pixel driving circuit and a sixth organic light emitting diode OLED6.

The first sub-pixel driving circuit includes a first data writing-in transistor T11, a first driving transistor T12, a first storage capacitor C1 and a first detecting transistor T13. A gate electrode of T11 is connected to the first gate line G1, a drain electrode of T11 is connected to the first data line Data1, and a source electrode of T11 is connected to a gate electrode of T12. The drain electrode of T12 is connected to the power supply voltage terminal for inputting power supply voltage VDD, the source electrode of T12 is connected to the anode of OLED1; the cathode of OLED1 is grounded. The first end of C1 is connected to the gate electrode of T12, and the second end of C1 is connected to the source electrode of T12. A gate electrode of T13 is connected to the first gate line G1, a drain electrode of T13 is connected to a source electrode of the T12, and a drain electrode of T13 is connected to the first external compensation line Sense1. The second sub-pixel driving circuit includes a second data writing-in transistor T21, a second driving transistor T22, a second storage capacitor C2 and a second detecting transistor T23.

A gate electrode of T21 is connected to the second gate line G2, a drain electrode of T21 is connected to the first data line Data1, and a source electrode of T21 is connected to a gate electrode of T22. A drain electrode of T22 is connected to a power supply voltage terminal for inputting power supply voltage VDD, a source electrode of T22 is connected to an anode of the OLED2; a cathode of the OLED2 is grounded. The first end of C2 is connected to the gate electrode of T22, and the second end of C2 is connected to the source electrode of T22; a gate electrode of T23 is connected to the second gate line G2, a drain electrode of T23 is connected to a source electrode of T22, and a source electrode of T23 is connected to the first external compensation line Sense1. The third sub-pixel driving circuit includes a third data writing transistor T31, a third driving transistor T32, a third storage capacitor C3 and a third detecting transistor T33. A gate electrode of T31 is connected to the first gate line G1, a drain electrode of T31 is connected to a second data line Data2, and a source electrode of T31 is connected to a gate electrode of T32. A drain electrode of T32 is connected to a power supply voltage terminal for inputting power supply voltage VDD, a source electrode of T32 is connected to an anode of the OLED3; a cathode of the OLED3 is grounded. The first end of C3 is connected to the gate electrode of T32, and the second end of C3 is connected to the source electrode of T32. A gate electrode of T33 is connected to the first gate line G1, a drain electrode of T33 is connected to a source electrode of T32, and a source electrode of T33 is connected to the first external compensation line Sense1.

The fourth sub-pixel driving circuit includes a fourth data writing-in transistor T41, a fourth driving transistor T42, a fourth storage capacitor C4 and a fourth detecting transistor T43. A gate electrode of T41 is connected to the second gate line G12, a drain electrode of T41 is connected to the second data line Data2, and a source electrode of T41 is connected to a gate electrode of T42. The drain electrode of T42 is connected to the power supply voltage terminal for inputting power supply voltage VDD, the source electrode of T42 is connected to the anode of the OLED4; the cathode of the OLED4 is grounded. The first end of C4 is connected to the gate electrode of T42, and the second end of C4 is connected to the source electrode of T42.

A gate electrode of T43 is connected to the second gate line G2, a drain electrode of T43 is connected to a source electrode of the T42, and a source electrode of T43 is connected to the second external compensation line Sense2. The fifth sub-pixel driving circuit includes a fifth data writing-in transistor T51, a fifth driving transistor T52, a fifth storage capacitor C5 and a fifth detecting transistor T53. A gate electrode of T51 is connected to the first gate line G1, a drain electrode of T51 is connected to the third data line Data3, and a source electrode of T51 is connected to a gate electrode of T52. The drain electrode of T52 is connected to the power supply voltage terminal for inputting power supply voltage VDD, the source electrode of T52 is connected to the anode of the OLED5; the cathode of the OLED5 is grounded. The first end of C5 is connected to the gate electrode of T52, and the second end of C5 is connected to the source electrode of T52; a gate electrode of T53 is connected to the first gate line G1, a drain electrode of T53 is connected to a source electrode of T52, and a source electrode of T53 is connected to the second external compensation line Sense2.

The sixth sub-pixel driving circuit includes a sixth data writing-in transistor T61, a sixth driving transistor T62, a sixth storage capacitor C6 and a sixth detecting transistor T63. A gate electrode of T61 is connected to the second gate line G2, a drain electrode of T61 is connected to a third data line Data3, and a source electrode of T61 is connected to a gate of T62. A drain electrode of T62 is connected to a power supply voltage terminal for inputting power supply voltage VDD, a source electrode of T62 is connected to an anode of the OLED6, and a cathode of the OLED6 is grounded. The first end of C6 is connected to the gate electrode of T62, and the second end of C6 is connected to the source electrode of T62. The gate electrode of T63 is connected to the second gate line G2, the drain electrode of T63 is connected to the source electrode of T62, and the source electrode of T63 is connected to the second external compensation line Sense2.

In a specific embodiment of the pixel structure shown in FIG. 7, the first sub-pixel circuit is a first red sub-pixel circuit, the OLED1 is a first red OLED, the second sub-pixel circuit is a first green sub-pixel circuit, and the OLED2 is a first green OLED; the third sub-pixel circuit is a first blue sub-pixel circuit, the OLED3 is a first blue OLED; the fourth sub-pixel circuit is a second red sub-pixel circuit, the OLED4 is a second red OLED; and the fifth sub-pixel circuit is the second green sub-pixel circuit, the OLED5 is the second green OLED; the sixth sub-pixel circuit is the second blue sub-pixel circuit, and the OLED6 is the second blue OLED.

In the specific embodiment of the pixel structure shown in FIG. 7, all of the transistors are n-type transistors, but not limited thereto.

The present disclosure discloses a specific embodiment of the pixel structure shown in FIG. 7 when performing display driving, the display period includes a first display period and a second display period. In the first display period, the first data line Data1 outputs a first data voltage Vdata1, the second data line Data2 outputs a second data voltage Vdata2, and the third data line Data3 outputs a third data voltage Vdata3. Under the control of the first gate line G1, the first sub-pixel driving circuit drives OLED1 by Vdata1, the third sub-pixel driving circuit drives OLED3 by Vdata2, and the fifth sub-pixel driving circuit drives OLED5 by Vdata3; In the second display period, the first data line Data1 outputs a fourth data voltage Vdata4, the second data line Data2 outputs a fifth data voltage Vdata5, and the third data line Data3 outputs a sixth data voltage Vdata6. Under the control of the second gate line G2, the second sub-pixel driving circuit drives OLED2 by Vdata4, the fourth sub-pixel driving circuit drives OLED4 by Vdata5, and the sixth sub-pixel driving circuit drives OLED6 by Vdata6.

In a specific implementation, the first display time period may include a first display phase, a third display phase, and a fifth display phase; and the second display time period may include a second display phase, a fourth display phase, and a sixth display phase. In the first display phase, Data1 outputs the first data voltage Vdata1, and under the control of the first gate line G1, T11 is turned on to write the first data voltage Vdata1 to the gate electrode of T12 and T12 drives OLED1 by the voltage at the gate electrode of T12. In the second display phase, Data2 outputs the fifth data voltage Vdata5. Under the control of the second gate line G2, T41 is turned on to write Vdata5 to the gate electrode of T42 and T42 drives OLED4 according to the voltage at the gate electrode of T42. In the third display phase, Data3 outputs the third data voltage Vdata3, and under the control of the first gate line G1, T51 is turned on to write Vdata3 to the gate electrode of T52, and T52 drives OLED5 by the voltage at the gate electrode of T52. In the fourth display phase, Data1 outputs the fourth data voltage Vdata4, and under the control of the second gate line G2, T21 is turned on to write Vdata4 to the gate electrode of T22, and T22 drives OLED2 by the voltage at the gate electrode of T22. In the fifth display phase, Data2 outputs the second data voltage Vdata2, and under the control of the first gate line G1, T31 is turned on to write Vdata2 to the gate electrode of T32, and T32 drives OLED3 by the voltage at the gate electrode of T32. In the sixth display phase, Data3 outputs the sixth data voltage Vdata6, and under the control of the second gate line G2, T61 is turned on to write Vdata6 to the gate electrode of T62, and T62 drives OLED6 by the voltage at the gate electrode of T62.

Figure 8:
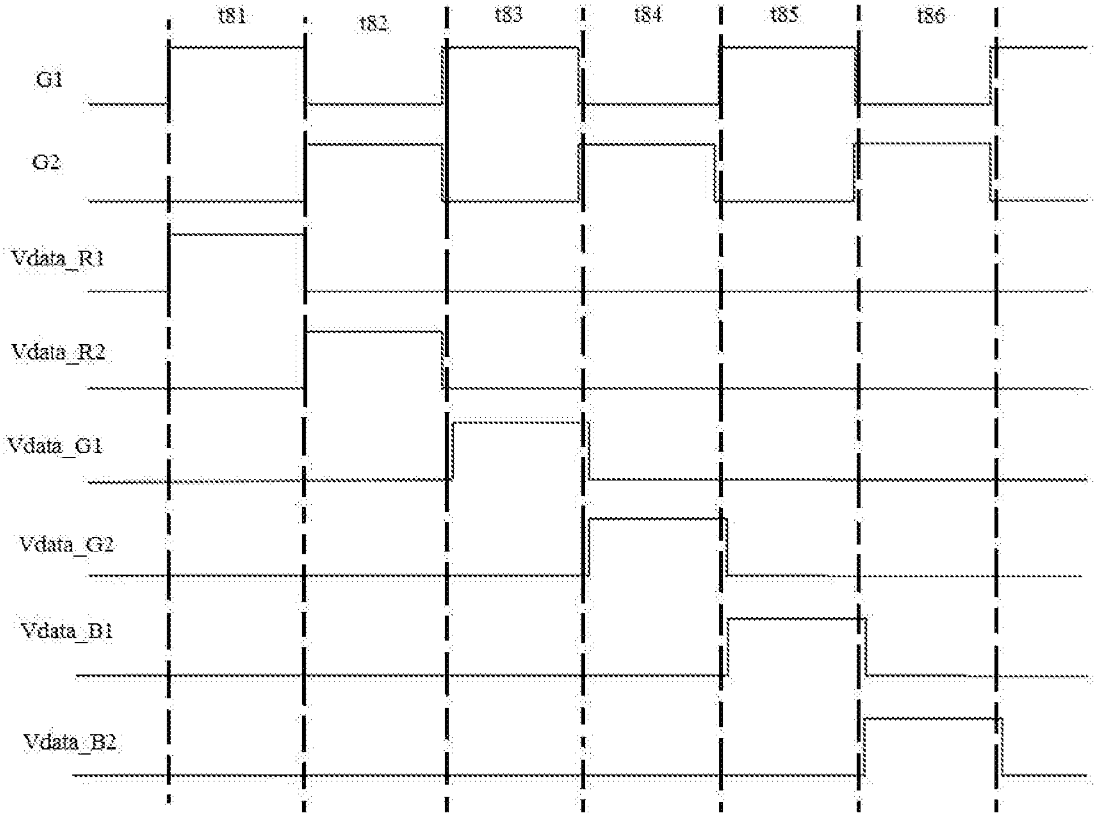
FIG. 8 is a time sequence diagram showing the operation of the pixel structure shown in FIG. 7 during displaying a solid color according to an embodiment of the present disclosure.

As shown in FIG. 8, when the pixel structure shown in FIG. 7 displays a solid color, G1 and G2 are alternately turned on. In the first red display period t81, G1 inputs a high level, G2 inputs a low level, Data1 outputs a first red data voltage Vdata_R1, and OLED1 emits a red light. In the second red display period t82, G2 inputs a high level, G1 inputs a low level, Data2 outputs a second red data voltage Vdata_R2, and OLED4 emits a red light. In the first green display period t83, G1 inputs a high level, G2 inputs a low level, Data3 outputs a first green data voltage Vdata_G1, and OLED5 emits green light. In the second green display period t84, G2 inputs a high level, G1 inputs a low level, Data1 outputs a second green data voltage Vdata_G2, and OLED2 emits green light. In the first blue display period t85, G1 inputs a high level, G2 inputs a low level, Data2 outputs a first blue data voltage Vdata_B1, and OLED3 emits a blue light. In the second blue display period t86, G2 inputs a high level, G1 inputs a low level, Data3 outputs a second blue data voltage Vdata_B2, and OLED6 emits a blue light.

In FIG. 8, the first red display period t81 is also the first display phase, and Vdata_R1 is also the first data voltage Vdata1; the second red display period t82 is also the second display phase. Vdata_R2 is also the fifth data voltage Vdata5; the first green display period t83 is also the third display phase, Vdata_G1 is also the third data voltage Vdata3; the second green display period t84 is also the fourth display phase, Vdata_G2 is also the fourth data voltage Vdata4; the first blue display period t85 is also the fifth display phase, and Vdata_B1 is also the second data voltage Vdata2; the two blue display period t86 is also the sixth display phase, and Vdata_B2 is also the sixth data voltage Vdata6.

When the external compensation control is performed on the pixel structure in the display panel according to the embodiment of the present disclosure, external compensation and control may be performed on one sub-pixel circuit in an external compensation control period, or external compensation and control may be performed on two sub-pixel circuits simultaneously in an external compensation control period. The above two cases are described in detail below.

The present disclosure discloses a specific embodiment of the pixel structure as shown in FIG. 7. When performing external compensation and control, the external compensation control period may include six external compensation control phases, and external compensation and control is performed on each sub-pixel circuit in each external compensation control phase.

In the first external compensation control phase, Data1 outputs the first red data voltage Vdata_R1, G1 inputs the high level, G2 inputs the low level, and T11 and T13 are both turned on to input Vdata_R1 to the gate electrode of T12, and write the voltage at the source electrode of T12 to Sense1 to perform external compensation and control on the first sub-pixel circuit. In the second external compensation control phase, Data1 outputs the first green data voltage Vdata_G1, G2 inputs a high level, G1 inputs a low level, and T21 and T23 are both turned on to input Vdata_G1 to the gate electrode of T22, and write the voltage at the source electrode of T22 to Sense1 to perform external compensation and control on the second sub-pixel circuit. In the third external compensation control phase, Data2 outputs the first blue data voltage Vdata_B1, G1 inputs the high level, G2 inputs the low level, and T31 and T33 are both turned on to input Vdata_B1 to the gate electrode of T32, and write the voltage at the source electrode of T32 to Sense1 to perform external compensation and control on the third sub-pixel circuit. In the fourth external compensation control phase, Data2 outputs a second red data voltage Vdata_R2, G2 inputs a high level, G1 inputs a low level, and T41 and T43 are both turned on to input Vdata_R2 to the gate electrode of T42, and write the voltage at the source electrode of T42 to Sense2 to perform external compensation and control on the fourth sub-pixel circuit. In the fifth external compensation control phase, Data3 outputs a second green data voltage Vdata_G2, G1 inputs a high level, G2 inputs a low level, and both T51 and T53 are turned on to input Vdata_G2 to the gate electrode of T52 and write the voltage at the source electrode of T52 to Sense2 to perform external compensation and control on the fifth sub-pixel circuit. In the sixth external compensation control phase, Data3 outputs a second blue data voltage Vdata_B2, G2 inputs a high level, G1 inputs a low level, and T61 and T63 are both turned on to input Vdata_B2 to the gate electrode of T62, and write the voltage at the source electrode of T62 to Sense2 to perform external compensation and control on the sixth sub-pixel circuit.

When external compensation and control is performed on the pixel structure as shown in FIG. 7, external compensation and control may be sequentially performed on sub-pixel circuits in a same color, for example, the first sub-pixel circuit and the fourth sub-pixel circuit (the first sub-pixel circuit and the fourth sub-pixel circuit are both red sub-pixel circuits).

Figure 9:
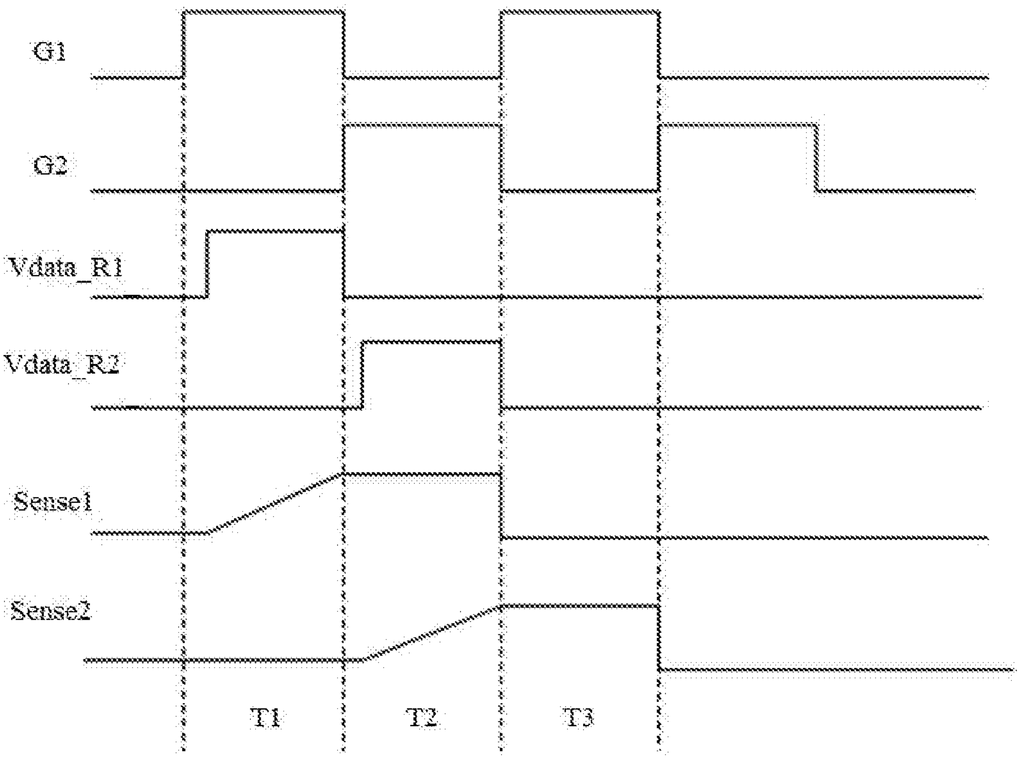
FIG. 9 is a time sequence diagram showing the operation of the pixel structure shown in FIG. 7 during externally compensating and controlling sub-pixel circuits in one color in sequence according to an embodiment of the present disclosure.

As shown in FIG. 9, in the first time period T1, G1 inputs a high level, G2 inputs a low level, Data1 outputs a first red data voltage Vdata_R1, and both T11 and T13 are turned on to input Vdata_R1 to the gate electrode of T12, and write the voltage at the source electrode of T12 to Sense1 to perform external compensation and control on the first sub-pixel circuit.

In the second time period T2, G2 inputs a high level, G1 inputs a low level, Data2 outputs a second red data voltage Vdata_R2, T41 and T43 are both turned on to input Vdata_R2 to the gate electrode of T42, and write the voltage at the source electrode of T42 to Sense2 to perform external compensation and control on the fourth sub-pixel circuit.

In FIG. 9, the label T3 is the third time period.

When external compensation and control is performed on the pixel structure as shown in FIG. 7, external compensation and control may be performed on first sub-pixel circuit and the fifth sub-pixel circuit at the same time.

Figure 10:
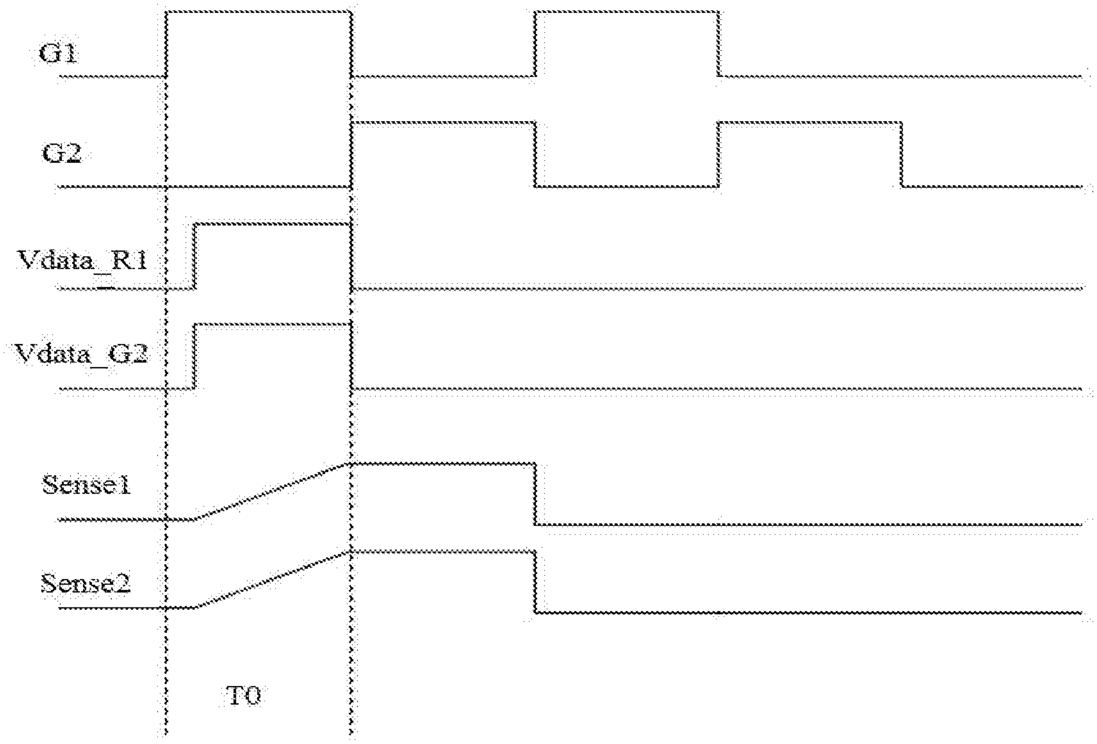
FIG. 10 is a time sequence diagram showing the operation of the pixel structure shown in FIG. 7 during externally compensating and controlling a first sub-pixel circuit and a fifth sub-pixel circuit at the same time in an external compensation control period according to an embodiment of the present disclosure.

As shown in FIG. 10, in an external compensation control period T0, Data1 outputs a first red data voltage Vdata_R1, Data3 inputs a second green data voltage Vdata_G2, G1 inputs a high level, G2 inputs a low level, and T11 and T13 are both turned on to write Vdata_R1 to the gate electrode of T12, and write the voltage at the source electrode of T12 to Sense1 to perform external compensation and control on the first sub-pixel circuit. Both T51 and T53 are turned on to write Vdata_G2 to the gate electrode of T52, and write the voltage at the source electrode of T52 to Sense2 to perform external compensation and control on the first sub-pixel circuit and the fifth sub-pixel circuit simultaneously in the external compensation control period T0, thereby improving the external compensation speed, and improving the compensation capability.

During the external compensation control period T0, Data2 outputs a shutdown control voltage, G1 inputs a high level, G2 inputs a low level, T31 and T33 are both turned on, and the shutdown control voltage is written to the gate electrode of T32, thereby controlling T32 to be turned off. Since the source electrode of T32 and the source electrode of T12 are simultaneously connected to Sense1, in order to prevent the third sub-pixel circuit from affecting the voltage on Sense1, it is necessary to control T32 to be turned off during the external compensation control period T0.

When external compensation and control is performed on the pixel structure as shown in FIG. 7, external compensation and control may be performed on third sub-pixel circuit and the fifth sub-pixel circuit at the same time.

Figure 11:
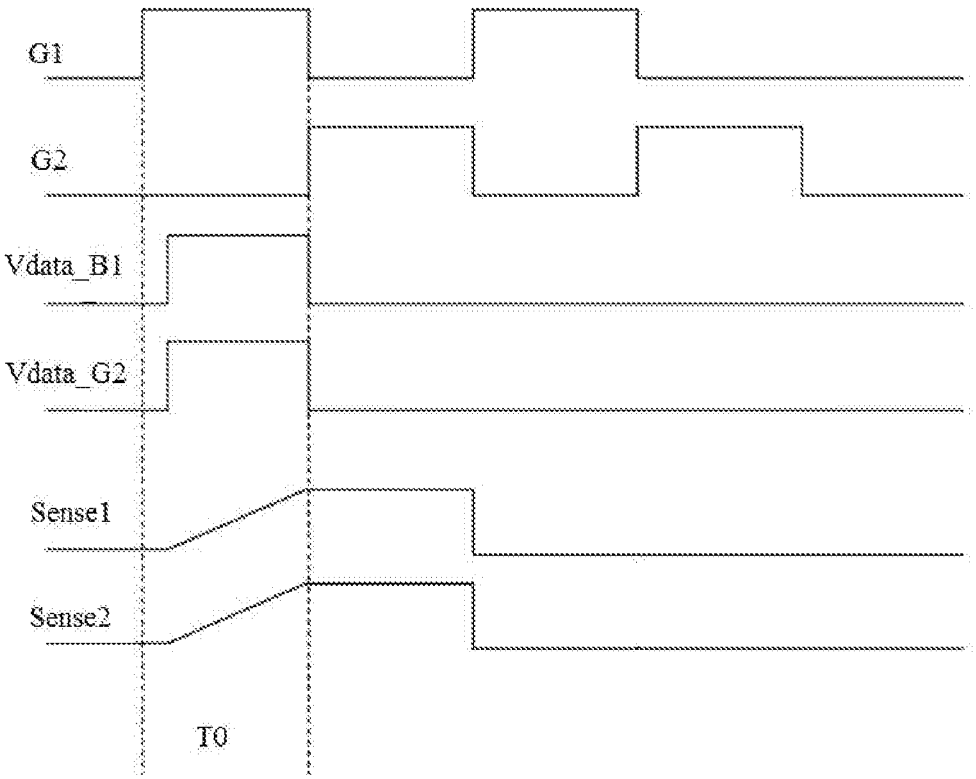
FIG. 11 is a time sequence diagram showing the operation of the pixel structure shown in FIG. 7 during externally compensating and controlling a third sub-pixel circuit and a fifth sub-pixel circuit at the same time in an external compensation control period according to an embodiment of the present disclosure.

As shown in FIG. 11, in an external compensation control period T0, Data2 outputs a first blue data voltage Vdata_B1, Data3 inputs a second green data voltage Vdata_G2, G1 inputs a high level, G2 inputs a low level, and T31 and T33 both are turned on to write Vdata_B1 to the gate electrode of T32, and write the voltage at the source electrode of T32 to Sense1 to perform external compensation and control on the third sub-pixel circuit. Both T51 and T53 are turned on to write Vdata_G2 to the gate electrode of T52, and write the voltage at the source electrode of T52 to Sense2 to perform the external compensation and control on the third sub-pixel circuit and the fifth sub-pixel circuit simultaneously in the external compensation control period T0, thereby improving the external compensation speed, and improving the compensation capability.

During the external compensation control period T0, Data1 outputs a shutdown control voltage, G1 inputs a high level, G2 inputs a low level, T11 and T13 are both turned on, and the shutdown control voltage is written to the gate electrode of T12, thereby controlling T12 to be turned off. Since the source electrode of T32 and the source electrode of T12 are simultaneously connected to Sense1, in order to prevent the first sub-pixel circuit from affecting the voltage on Sense1, it is necessary to control T12 to be turned off during the external compensation control period T0.

When external compensation and control is performed on the pixel structure as shown in FIG. 7, external compensation and control may be performed on second sub-pixel circuit and the fourth sub-pixel circuit at the same time.

Figure 12:
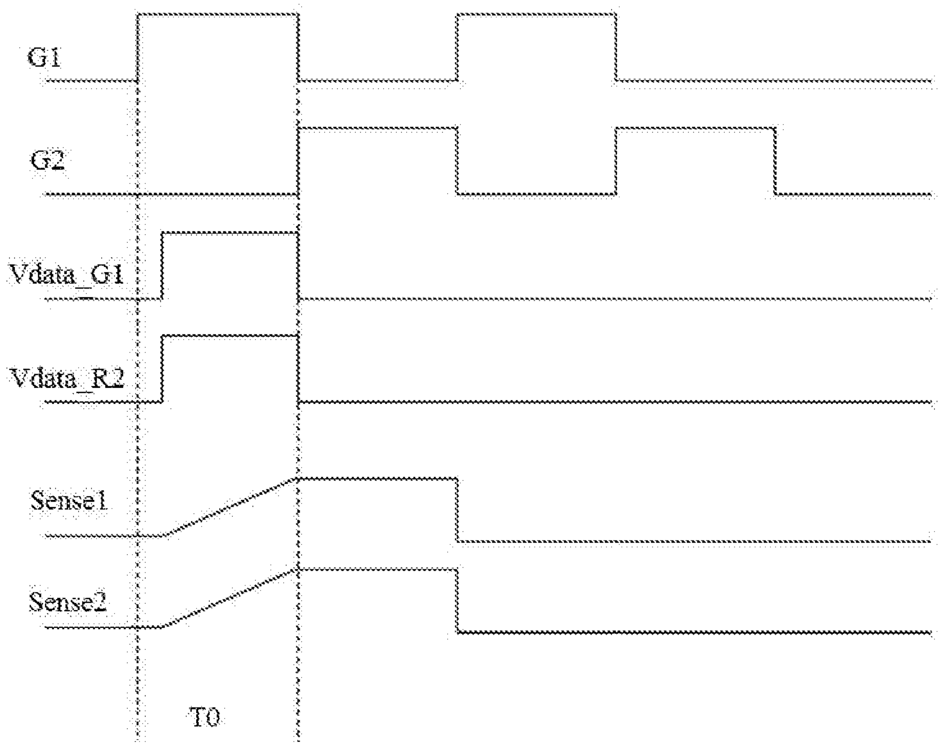
FIG. 12 is a time sequence diagram showing the operation of the pixel structure shown in FIG. 7 during externally compensating and controlling a second sub-pixel circuit and a fourth sub-pixel circuit at the same time in an external compensation control period according to an embodiment of the present disclosure.

As shown in FIG. 12, in an external compensation control period T0, Data1 outputs a first green data voltage Vdata_G1, Data2 inputs a second red data voltage Vdata_R2, G1 inputs a low level, G2 inputs a high level, and T21 and T23 are both turned on to write Vdata_G1 to the gate electrode of T22, and write the voltage at the source electrode of T22 to Sense1 to perform external compensation and control on the second sub-pixel circuit. Both T41 and T43 are turned on to write Vdata_R2 to the gate electrode of T42, and write the source voltage of T42 to Sense2 to perform external compensation and control on the second sub-pixel circuit and the fourth sub-pixel circuit simultaneously in the external compensation control period T0, thereby improving the external compensation speed and improving the compensation capability.

During the external compensation control period T0, Data3 outputs a shutdown control voltage, G2 inputs a high level, G1 inputs a low level, T61 and T63 are both turned on, and the shutdown control voltage is written to the gate electrode of T62, thereby controlling T62 to be turned off. Since the source electrode of T62 and the source electrode of T42 are simultaneously connected to Sense2, in order to prevent the fourth six-subpixel circuit from affecting the voltage on Sense2, it is necessary to control T62 to be turned off during the external compensation control period T0.

When external compensation and control is performed on the pixel structure as shown in FIG. 7, external compensation and control may be performed on second sub-pixel circuit and the sixth sub-pixel circuit at the same time.

Figure 13:
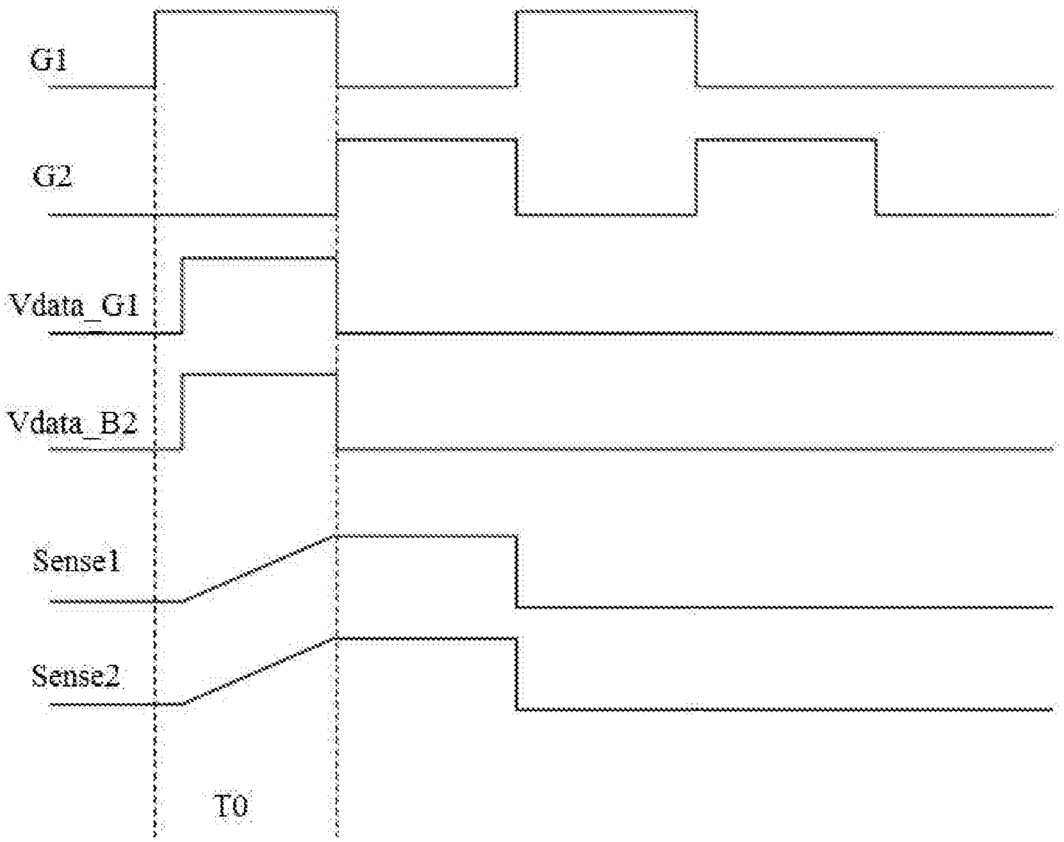
FIG. 13 is a time sequence diagram showing the operation of the pixel structure shown in FIG. 7 during externally compensating and controlling a second sub-pixel circuit and a sixth sub-pixel circuit at the same time in an external compensation control period according to an embodiment of the present disclosure.

As shown in FIG. 13, in an external compensation control period T0, Data1 outputs a first green data voltage Vdata_G1, Data2 inputs a second blue data voltage Vdata_B2, G1 inputs a low level, G2 inputs a high level, and T21 and T23 both turned on to write Vdata_G1 to the gate electrode of T22, and write the voltage at the source electrode of T22 to Sense1 to perform external compensation and control on the second sub-pixel circuit. Both T61 and T63 are turned on to write Vdata_B2 to the gate electrode of T62 and write the voltage at the source electrode of T62 to Sense2 to perform external compensation and control on the second sub-pixel circuit and the sixth sub-pixel circuit simultaneously in the external compensation control period T0, thereby improving the external compensation speed and improving the compensation capability.

During the external compensation control period T0, Data2 outputs a shutdown control voltage, G2 inputs a high level, G1 inputs a low level, T41 and T43 are both turned on, and the shutdown control voltage is written to the gate electrode of T42, thereby controlling T42 to be turned off. Since the source electrode of T62 and the source electrode of T42 are simultaneously connected to Sense2, in order to prevent the fourth sub-pixel circuit from affecting the voltage on Sense2, it is necessary to control T42 to be turned off during the external compensation control period T0.

In a specific embodiment of the present disclosure, since each transistor in the pixel structure is an n-type transistor, the turn-off control voltage may be a negative voltage, a low voltage, or zero to control the driving transistor whose gate electrode receiving the turn-off control voltage to be turned off, but not limited to this.

The method of driving the display panel according to the embodiment of the present disclosure is applied to the display panel, the display period includes a first display period and a second display period; and the method of driving the display panel includes the following steps.

In the first display period, the first data line outputs a first data voltage, the second data line outputs a second data voltage, and the third data line outputs a third data voltage. Under the control of the first gate line, a first sub-pixel driving circuit of the pixel unit drives a first light-emitting element of the first pixel units according to the first data voltage, and a third sub-pixel driving circuit of the first pixel unit drives a third light-emitting element of the first pixel unit according to the second data voltage, and a second sub-pixel driving circuit of the second pixel unit drives a second light-emitting element of the second pixel unit according to the third data voltage.

In the second display period, the first data line outputs a fourth data voltage, the second data line outputs a fifth data voltage, and the third data line outputs a sixth data voltage. Under the control of the second gate line, a second sub-pixel driving circuit in the first pixel unit drives a second light-emitting element of the first pixel unit according to the fourth data voltage, a first sub-pixel driving circuit of the second pixel unit drives the first light-emitting element of the second pixel unit according to the fifth data voltage, and the third sub-pixel driving circuit of the second pixel unit drives the third light-emitting element of the second pixel unit according to the sixth data voltage.

In a specific implementation, the display period may be divided into two display periods. In the first display period, the first sub-pixel circuit in the first pixel unit, the third sub-pixel circuit in the first pixel unit and the second sub-pixel circuit in the second pixel unit performs display driving, In the second display period, the second sub-pixel circuit in the first pixel unit, the first sub-pixel circuit in the second pixel unit, and the third sub-pixel circuit in the second pixel unit perform display driving.

Specifically, the first sub-pixel driving circuit in the first pixel unit includes a first data writing-in circuit and a first driving circuit; and the second sub-pixel driving circuit in the first pixel unit includes a second data writing-in circuit and a second driving circuit; the third sub-pixel driving circuit in the first pixel unit includes a third data writing-in circuit and a third driving circuit; and the first sub-pixel driving circuit in the second pixel unit includes a fourth data writing-in circuit and a fourth driving circuit; the second sub-pixel driving circuit in the second pixel unit includes a fifth data writing-in circuit and a fifth driving circuit; and a third sub-pixel driving circuit in the second pixel unit includes a sixth data writing-in circuit and a sixth driving circuit. The first display period may include a first display phase, a third display phase, and a fifth display phase; and the second display period may include a second display phase, a fourth display phase and a sixth display phase.

The driving method of the display panel may include: in the first display phase, the first data line outputting the first data voltage, and under the control of the first gate line, the first data writing-in circuit writing the first data voltage to the control end of the first driving circuit, the first driving circuit driving the first light-emitting element of the first pixel unit according to the voltage at the control end of the first driving circuit; in the second display phase, the second data line outputting the fifth data voltage, and under the control of the second gate line, the fourth data writing-in circuit writing the fifth data voltage to the control end of the fourth driving circuit, the fourth driving circuit driving the first light-emitting element of the second pixel unit according to the voltage at the control end of the fourth driving circuit; in the third display phase, the third data line outputting the third data voltage, and under the control of the first gate line, the fifth data writing-in circuit writing the third data voltage to the control end of the fifth driving circuit, the fifth driving circuit driving the second light-emitting element of the second pixel unit according to the voltage at the control end of the fifth driving circuit; in the fourth display phase, the first data line outputting the fourth data voltage, and under the control of the second gate line, the second data writing-in circuit writing the fourth data voltage to the control end of the second driving circuit, the second driving circuit driving the second light-emitting element of the first pixel unit according to the voltage at the control end of the second driving circuit; in the fifth display phase, the second data line outputting a second data voltage, and under the control of the first gate line, the third data writing-in circuit writing the second data voltage to a control end of the third driving circuit, the third driving circuit driving the third light-emitting element of the first pixel unit according to a voltage at the control end of the third driving circuit; in the sixth display phase, the third data line outputting a sixth data voltage, and under the control of the second gate line, the sixth data writing-in circuit writing the sixth data voltage to a control end of the sixth driving circuit, the sixth driving circuit drives the third light-emitting element of the second pixel unit according to the voltage at the control end of the sixth driving circuit.

In a specific implementation, the first display period may include a first display phase, a third display phase, and a fifth display phase, and the second display period may include a second display phase, a fourth display phase and a sixth display phase. In a display phase, a driving circuit of the pixel structure drives a corresponding light-emitting element to emit light.

The compensation control method for the display panel according to the embodiment of the present disclosure is applied to the display panel described above, and the external compensation control period includes six external compensation control phases.

The compensation control method of the display panel includes: in a $(2n-1)^{th}$ external compensation control phase, an $n^{th}$ data line outputting a $(2n-1)^{th}$ data voltage, and under the control of the first gate line, a $(2n-1)^{th}$ data writing-in circuit writing the $(2n-1)^{th}$ data voltage to a control end of a $(2n-1)^{th}$ driving circuit, a $(2n-1)^{th}$ external compensation detecting circuit writing a voltage at a second end of the $(2n-1)^{th}$ driving circuit to a first external compensation line; in a $2n^{th}$ external compensation control period, an $n^{th}$ data line outputting a $2n^{th}$ data voltage, and under the control of the second gate line, a $2n^{th}$ data writing-in circuit writing the $2n^{th}$ data voltage to a control end of a $2n^{th}$ driving circuit, a $2n^{th}$ external compensation detecting circuit writing a voltage at a second end of the $2n^{th}$ driving circuit to a second external compensation line; n is a positive integer less than or equal to 3.

When performing external compensation and control, the external compensation control period may include six external compensation control phases, and the external compensation and control is performed on each sub-pixel circuit in each external compensation control phase.

The compensation control method of the display panel according to the embodiment of the present disclosure is applied to the display panel, and the compensation control method of the display panel includes: in an external compensation control period, the first data line outputting the first data voltage, and under the control of the first gate line, the first data writing-in circuit writing the first data voltage to the control end of the first driving circuit, the first external compensation detecting circuit writing the voltage at the second end of the first driving circuit to the first external compensation line, the third data line outputting the fifth data voltage, under the control of the first gate line, the fifth data writing-in circuit writing the fifth data voltage to the control end of the fifth driving circuit, and the fifth external compensation detecting circuit writing the voltage at the second end of the fifth driving circuit to the second external compensation line; in the external compensation control period, the second data line outputting a turn-off control voltage, and under the control of the first gate line, the third data writing-in circuit writing the turn-off control voltage to the control end of the third driving circuit to disconnect the first end and the second end of the third driving circuit.

External compensation and control may be simultaneously performed on the first sub-pixel driving circuit of the first pixel unit and the second sub-pixel driving circuit of the second pixel unit in a same external compensation control period, thereby improving the compensation ability of the pixel structure in the display panel, and speeding up the compensation. However, since the third data writing-in circuit of the third sub-pixel driving circuit of the first pixel unit also connect the second data line to the control end of the third driving circuit of the third sub-pixel driving circuit in the external compensation control period, it is necessary to control the second data line to output the turn-off control voltage so that the third driving circuit is turned off, thereby not affecting the external compensation control of the first sub-pixel driving circuit of the first pixel unit.

The compensation control method of the display panel according to the embodiment of the present disclosure is applied to the display panel, and the compensation control method of the display panel includes: in an external compensation control period, the second data line outputting the third data voltage, and under the control of the first gate line, the third data writing-in circuit writing the third data voltage to the control end of the third driving circuit, the third external compensation detecting circuit writing the voltage at the second end of the third driving circuit to the first external compensation line, the third data line outputting the fifth data voltage, under the control of the first gate line, the fifth data writing-in circuit writing the fifth data voltage to the control end of the fifth driving circuit, and the fifth external compensation detecting circuit writing the voltage at the second end of the fifth driving circuit to the second external compensation line; in the external compensation control period, the first data line outputting a turn-off control voltage, and under the control of the first gate line, the first data writing-in circuit writing the turn-off control voltage to the control end of the first driving circuit to disconnect the first end and the second end of the first driving circuit.

External compensation and control may be simultaneously performed on the third sub-pixel driving circuit of the first pixel unit and the second sub-pixel driving circuit of the second pixel unit in a same external compensation control period, thereby improving the compensation ability of the pixel structure in the display panel, and speeding up the compensation. However, since the first data writing-in circuit of the first sub-pixel driving circuit of the first pixel unit also connect the first data line to the control end of the first driving circuit of the first sub-pixel driving circuit in the external compensation control period, it is necessary to control the first data line to output the turn-off control voltage so that the first driving circuit is turned off, thereby not affecting the external compensation control of the third sub-pixel driving circuit of the first pixel unit.

The compensation control method of the display panel according to the embodiment of the present disclosure is applied to the display panel, and the compensation control method of the display panel includes: in an external compensation control period, the first data line outputting the second data voltage, and under the control of the second gate line, the second data writing-in circuit writing the second data voltage to the control end of the second driving circuit, the second external compensation detecting circuit writing the voltage at the second end of the second driving circuit to the first external compensation line, the second data line outputting the fourth data voltage, under the control of the second gate line, the fourth data writing-in circuit writing the fourth data voltage to the control end of the fourth driving circuit, and the fourth external compensation detecting circuit writing the voltage at the second end of the fourth driving circuit to the second external compensation line; in the external compensation control period, the third data line outputting a turn-off control voltage, and under the control of the second gate line, the sixth data writing-in circuit writing the turn-off control voltage to the control end of the sixth driving circuit to disconnect the first end and the second end of the sixth driving circuit.

External compensation and control may be simultaneously performed on the second sub-pixel driving circuit of the first pixel unit and the first sub-pixel driving circuit of the second pixel unit in a same external compensation control period, thereby improving the compensation ability of the pixel structure in the display panel, and speeding up the compensation. However, since the sixth data writing-in circuit of the third sub-pixel driving circuit of the second pixel unit also connect the third data line to the control end of the sixth driving circuit of the third sub-pixel driving circuit in the external compensation control period, it is necessary to control the third data line to output the turn-off control voltage so that the sixth driving circuit is turned off, thereby not affecting the external compensation control of the first sub-pixel driving circuit of the second pixel unit.

The compensation control method of the display panel according to the embodiment of the present disclosure is applied to the display panel, and the compensation control method of the display panel includes: in an external compensation control period, the first data line outputting the second data voltage, and under the control of the second gate line, the second data writing-in circuit writing the second data voltage to the control end of the second driving circuit, the second external compensation detecting circuit writing the voltage at the second end of the second driving circuit to the first external compensation line, the third data line outputting the sixth data voltage, under the control of the second gate line, the sixth data writing-in circuit writing the sixth data voltage to the control end of the sixth driving circuit, and the sixth external compensation detecting circuit writing the voltage at the second end of the sixth driving circuit to the second external compensation line; in the external compensation control period, the second data line outputting a turn-off control voltage, and under the control of the second gate line, the fourth data writing-in circuit writing the turn-off control voltage to the control end of the fourth driving circuit to disconnect the first end and the second end of the fourth driving circuit.

External compensation and control may be simultaneously performed on the second sub-pixel driving circuit of the first pixel unit and the third sub-pixel driving circuit of the second pixel unit in a same external compensation control period, thereby improving the compensation ability of the pixel structure in the display panel, and speeding up the compensation. However, since the fourth data writing-in circuit of the first sub-pixel driving circuit of the second pixel unit also connect the second data line to the control end of the fourth driving circuit of the first sub-pixel driving circuit in the external compensation control period, it is necessary to control the second data line to output the turn-off control voltage so that the fourth driving circuit is turned off, thereby not affecting the external compensation control of the third sub-pixel driving circuit of the second pixel unit.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A pixel unit, comprising a first sub-pixel circuit, a second sub-pixel circuit and a third sub-pixel circuit, wherein the first sub-pixel circuit comprises a first sub-pixel driving circuit and a first light-emitting element, and the second sub-pixel circuit comprises a second sub-pixel driving circuit and a second light-emitting element;

the first sub-pixel driving circuit and the second sub-pixel driving circuit are connected to a first data line, and the first sub-pixel driving circuit is connected to a first gate line, the second sub-pixel driving circuit is connected to the second gate line;

the first sub-pixel driving circuit is configured to drive the first light-emitting element by a data voltage on the first data line under the control of the first gate line;

the second sub-pixel driving circuit is configured to drive the second light-emitting element by the data voltage on the first data line under the control of the second gate line, the third sub-pixel circuit comprises a third sub-pixel driving circuit and a third light-emitting element, the third sub-pixel circuit is respectively connected to the first gate line and the second data line, and the third sub-pixel driving circuit is configured to drive the third light-emitting element to emit light by a data voltage on the second data line under the control of the first gate line, the first sub-pixel driving circuit comprises a first data writing-in circuit, a first driving circuit, and a first external compensation detecting circuit; the second sub-pixel driving circuit comprises a second data writing-in circuit, a second driving circuit, and a second external compensation detecting circuit; and the third sub-pixel driving circuit comprises a third data writing-in circuit, a third driving circuit, and a third external compensation detecting circuit;

the first external compensation detecting circuit, the second external compensation detecting circuit, and the third external compensation detecting circuit are all connected to the first external compensation line;

the first external compensation detecting circuit and the third external compensation detecting circuit are both connected to the first gate line, and the second external compensation detecting circuit is connected to the second gate line;

the first data writing-in circuit is connected to the first gate line and the first data line, respectively, and configured to write a data voltage at the first data line to the control end of the first driving circuit under the control of the first gate line;

a first end of the first driving circuit is connected to a power voltage end, and a second end of the first driving circuit is connected to the first light-emitting element, the first driving circuit is configured to drive the first light-emitting element to emit light by the voltage at the control end of the first driving circuit;

the first external compensation detecting circuit is connected to the second end of the first driving circuit, and configured to write the voltage at the second end of the first driving circuit to the first external compensation line under the control of the first gate line;

the second external compensation detecting circuit is connected to the second end of the second driving circuit, and configured to write the voltage at the second end of the second driving circuit to the first external compensation line under the control of the second gate line; and the third external compensation detecting circuit is connected to the second end of the third driving circuit, and configured to write the voltage at the second end of the third driving circuit to the first external compensation line under the control of the first gate line.

2. The pixel unit according to claim 1, wherein the first data writing-in circuit comprises a first data writing-in transistor; the first driving circuit comprises a first driving transistor and a first storage capacitor; and the first external compensation detecting circuit comprises a first detecting transistor;

a control electrode of the first data writing-in transistor is connected to the first gate line, a first electrode of the first data writing-in transistor is connected to the first data line, and a second electrode of the first data writing-in transistor is connected to the control electrode of the first driving transistor;

a first electrode of the first driving transistor is connected to the power voltage terminal, and a second electrode of the first driving transistor is connected to the first light-emitting element;

a first end of the first storage capacitor is connected to a control electrode of the first driving transistor, and a second end of the first storage capacitor is connected to a second electrode of the first driving transistor; and a control electrode of the first detecting transistor is connected to the first gate line, a first electrode of the first detecting transistor is connected to a second electrode of the first driving transistor, and a second electrode of the first detecting transistor is connected to the first external compensation line.

3. The pixel unit according to claim 1, wherein the second data writing-in circuit comprises a second data writing-in transistor; the second driving circuit comprises a second driving transistor and a second storage capacitor; and the second external compensation detecting circuit comprises a second detecting transistor;

a control electrode of the second data writing-in transistor is connected to the second gate line, a first electrode of the second data writing-in transistor is connected to the first data line, and a second electrode of the second data writing-in transistor is connected to a control electrode of the second driving transistor;

a first electrode of the second driving transistor is connected to the power voltage terminal, and a second electrode of the second driving transistor is connected to the second light-emitting element;

a first end of the second storage capacitor is connected to a control electrode of the second driving transistor, and a second end of the second storage capacitor is connected to a second electrode of the second driving transistor; and a control electrode of the second detecting transistor is connected to the second gate line, a first electrode of the second detecting transistor is connected to a second electrode of the second driving transistor, and a second electrode of the second detecting transistor is connected to the first external compensation line.

4. The pixel unit according to claim 1, wherein the third data writing-in circuit comprises a third data writing-in transistor; the third driving circuit comprises a third driving transistor and a third storage capacitor; and the third external compensation detecting circuit comprises a third detecting transistor;

a control electrode of the third data writing-in transistor is connected to the first gate line, a first electrode of the third data writing-in transistor is connected to the second data line, and a second electrode of the third data writing-in transistor is connected to a control electrode of the third driving transistor;

a first electrode of the third driving transistor is connected to the power voltage terminal, and a second electrode of the third driving transistor is connected to the third light-emitting element;

a first end of the third storage capacitor is connected to a control electrode of the third driving transistor, and a second end of the third storage capacitor is connected to a second electrode of the third driving transistor; and a control electrode of the third detecting transistor is connected to the first gate line, a first electrode of the third detecting transistor is connected to a second electrode of the third driving transistor, and a second electrode of the third detecting transistor is connected to the first external compensation line.

5. The pixel unit according to claim 1, wherein the first light-emitting element is a first organic light emitting diode, the second light-emitting element is a second organic light emitting diode, and the third light-emitting element is a third organic light emitting diode.

6. A display panel, comprising the pixel unit according to claim 1.

7. A display panel, comprising a pixel structure, wherein the pixel structure comprises two pixel units according to claim 1, the two pixel units comprise a first pixel unit and a second pixel unit;

a first sub-pixel driving circuit in the first pixel unit is respectively connected to the first gate line and the first data line;

a second sub-pixel driving circuit in the first pixel unit is respectively connected to the second gate line and the first data line;

a third sub-pixel driving circuit in the first pixel unit is respectively connected to the first gate line and the second data line;

a first sub-pixel driving circuit in the second pixel unit is respectively connected to the second gate line and the second data line;

a second sub-pixel driving circuit in the second pixel unit is respectively connected to the first gate line and the third data line; and the third sub-pixel driving circuit in the second pixel unit is respectively connected to the second gate line and the third data line.

8. The display panel according to claim 7, wherein a first sub-pixel driving circuit in the second pixel unit comprises a fourth external compensation detecting circuit, a fourth data writing-in circuit, and a fourth driving circuit; a second sub-pixel driving circuit in the second pixel unit comprises a fifth external compensation detecting circuit, a fifth data writing-in circuit and a fifth driving circuit; the third sub-pixel driving circuit in the second pixel unit comprises a sixth external compensation detecting circuit, a sixth data writing-in circuit and a sixth driving circuit;

and the fourth external compensation detecting circuit, the fifth external compensation detecting circuit, and the sixth external compensation detecting circuit are all connected to the second external compensation line.

9. A method of driving the display panel according to claim 7, comprising:

a display time period comprising a first display period and a second display period;

in the first display period, the first data line outputting a first data voltage, the second data line outputting a second data voltage, and the third data line outputting a third data voltage, under the control of the first gate line, a first sub-pixel driving circuit of the first pixel unit driving a first light-emitting element of the first pixel unit according to the first data voltage, and a third sub-pixel driving circuit of the first pixel unit driving a third light-emitting element of the first pixel unit according to the second data voltage, and a second sub-pixel driving circuit of the second pixel unit driving a second light-emitting element of the second pixel unit according to the third data voltage;

in the second display period, the first data line outputting a fourth data voltage, the second data line outputting a fifth data voltage, and the third data line outputting a sixth data voltage, under the control of the second gate line, a second sub-pixel driving circuit in the first pixel unit driving a second light-emitting element of the first pixel unit according to the fourth data voltage, a first sub-pixel driving circuit of the second pixel unit driving the first light-emitting element of the second pixel unit according to the fifth data voltage, and the third sub-pixel driving circuit of the second pixel unit driving the third light-emitting element of the second pixel unit according to the sixth data voltage.

10. A method of driving the display panel according to claim 8, comprising:

a display time period comprising a first display period and a second display period;

in the first display period, the first data line outputting a first data voltage, the second data line outputting a second data voltage, and the third data line outputting a third data voltage, under the control of the first gate line, a first sub-pixel driving circuit of the first pixel unit driving a first light-emitting element of the first pixel unit according to the first data voltage, and a third sub-pixel driving circuit of the first pixel unit driving a third light-emitting element of the first pixel unit according to the second data voltage, and a second sub-pixel driving circuit of the second pixel unit driving a second light-emitting element of the second pixel unit according to the third data voltage;

in the second display period, the first data line outputting a fourth data voltage, the second data line outputting a fifth data voltage, and the third data line outputting a sixth data voltage, under the control of the second gate line, a second sub-pixel driving circuit in the first pixel unit driving a second light-emitting element of the first pixel unit according to the fourth data voltage, a first sub-pixel driving circuit of the second pixel unit driving the first light-emitting element of the second pixel unit according to the fifth data voltage, and the third sub-pixel driving circuit of the second pixel unit driving the third light-emitting element of the second pixel unit according to the sixth data voltage.

11. The method according to claim 8, wherein the first display period comprises a first display phase, a third display phase, and a fifth display phase; and the second display period comprises a second display phase, a fourth display phase and a sixth display phase;

the method comprises:

in the first display phase, the first data line outputting the first data voltage, and under the control of the first gate line, the first data writing-in circuit writing the first data voltage to the control end of the first driving circuit, the first driving circuit driving the first light-emitting element of the first pixel unit according to the voltage at the control end of the first driving circuit;

in the second display phase, the second data line outputting the fifth data voltage, and under the control of the second gate line, the fourth data writing-in circuit writing the fifth data voltage to the control end of the fourth driving circuit, the fourth driving circuit driving the first light-emitting element of the second pixel unit according to the voltage at the control end of the fourth driving circuit;

in the third display phase, the third data line outputting the third data voltage, and under the control of the first gate line, the fifth data writing-in circuit writing the third data voltage to the control end of the fifth driving circuit, the fifth driving circuit driving the second light-emitting element of the second pixel unit according to the voltage at the control end of the fifth driving circuit;

in the fourth display phase, the first data line outputting the fourth data voltage, and under the control of the second gate line, the second data writing-in circuit writing the fourth data voltage to the control end of the second driving circuit, the second driving circuit driving the second light-emitting element of the first pixel unit according to the voltage at the control end of the second driving circuit;

in the fifth display phase, the second data line outputting a second data voltage, and under the control of the first gate line, the third data writing-in circuit writing the second data voltage to a control end of the third driving circuit, the third driving circuit driving the third light-emitting element of the first pixel unit according to a voltage at the control end of the third driving circuit; and in the sixth display phase, the third data line outputting a sixth data voltage, and under the control of the second gate line, the sixth data writing-in circuit writing the sixth data voltage to a control end of the sixth driving circuit, the sixth driving circuit drives the third light-emitting element of the second pixel unit according to the voltage at the control end of the sixth driving circuit.

12. The method according to claim 10, wherein the first display period comprises a first display phase, a third display phase, and a fifth display phase; and the second display period comprises a second display phase, a fourth display phase and a sixth display phase;

the method comprises:

in the first display phase, the first data line outputting the first data voltage, and under the control of the first gate line, the first data writing-in circuit writing the first data voltage to the control end of the first driving circuit, the first driving circuit driving the first light-emitting element of the first pixel unit according to the voltage at the control end of the first driving circuit;

in the second display phase, the second data line outputting the fifth data voltage, and under the control of the second gate line, the fourth data writing-in circuit writing the fifth data voltage to the control end of the fourth driving circuit, the fourth driving circuit driving the first light-emitting element of the second pixel unit according to the voltage at the control end of the fourth driving circuit;

in the third display phase, the third data line outputting the third data voltage, and under the control of the first gate line, the fifth data writing-in circuit writing the third data voltage to the control end of the fifth driving circuit, the fifth driving circuit driving the second light-emitting element of the second pixel unit according to the voltage at the control end of the fifth driving circuit;

in the fourth display phase, the first data line outputting the fourth data voltage, and under the control of the second gate line, the second data writing-in circuit writing the fourth data voltage to the control end of the second driving circuit, the second driving circuit driving the second light-emitting element of the first pixel unit according to the voltage at the control end of the second driving circuit;

in the fifth display phase, the second data line outputting a second data voltage, and under the control of the first gate line, the third data writing-in circuit writing the second data voltage to a control end of the third driving circuit, the third driving circuit driving the third light-emitting element of the first pixel unit according to a voltage at the control end of the third driving circuit; and in the sixth display phase, the third data line outputting a sixth data voltage, and under the control of the second gate line, the sixth data writing-in circuit writing the sixth data voltage to a control end of the sixth driving circuit, the sixth driving circuit drives the third light-emitting element of the second pixel unit according to the voltage at the control end of the sixth driving circuit.

13. A compensation control method for the display panel according to claim 8, wherein an external compensation control period comprises six external compensation control phases, the compensation control method comprises:

in a $(2n-1)^{th}$ external compensation control phase, an $n^{th}$ data line outputting a $(2n-1)^{th}$ data voltage, and under the control of the first gate line, a $(2n-1)^{th}$ data writing-in circuit writing the $(2n-1)^{th}$ data voltage to a control end of a $(2n-1)^{th}$ driving circuit, a $(2n-1)^{th}$ external compensation detecting circuit writing a voltage at a second end of the $(2n-1)^{th}$ driving circuit to a first external compensation line;

in a $2n^{th}$ external compensation control period, an $n^{th}$ data line outputting a $2n^{th}$ data voltage, and under the control of the second gate line, a $2n^{th}$ data writing-in circuit writing the $2n^{th}$ data voltage to a control end of a $2n^{th}$ driving circuit, a $2n^{th}$ external compensation detecting circuit writing a voltage at a second end of the $2n^{th}$ driving circuit to a second external compensation line;

n is a positive integer less than or equal to 3.

14. A compensation control method of the display panel according to claim 8, comprising:

in an external compensation control period, the first data line outputting the first data voltage, and under the control of the first gate line, the first data writing-in circuit writing the first data voltage to the control end of the first driving circuit, the first external compensation detecting circuit writing the voltage at the second end of the first driving circuit to the first external compensation line, the third data line outputting the fifth data voltage, under the control of the first gate line, the fifth data writing-in circuit writing the fifth data voltage to the control end of the fifth driving circuit, and the fifth external compensation detecting circuit writing the voltage at the second end of the fifth driving circuit to the second external compensation line;

in the external compensation control period, the second data line outputting a turn-off control voltage, and under the control of the first gate line, the third data writing-in circuit writing the turn-off control voltage to the control end of the third driving circuit to disconnect the first end and the second end of the third driving circuit.

15. A compensation control method of the display panel according to claim 8, comprising:

in an external compensation control period, the second data line outputting the third data voltage, and under the control of the first gate line, the third data writing-in circuit writing the third data voltage to the control end of the third driving circuit, the third external compensation detecting circuit writing the voltage at the second end of the third driving circuit to the first external compensation line, the third data line outputting the fifth data voltage, under the control of the first gate line, the fifth data writing-in circuit writing the fifth data voltage to the control end of the fifth driving circuit, and the fifth external compensation detecting circuit writing the voltage at the second end of the fifth driving circuit to the second external compensation line;

in the external compensation control period, the first data line outputting a turn-off control voltage, and under the control of the first gate line, the first data writing-in circuit writing the turn-off control voltage to the control end of the first driving circuit to disconnect the first end and the second end of the first driving circuit.

16. A compensation control method of the display panel according to claim 8, comprising:

in an external compensation control period, the first data line outputting the second data voltage, and under the control of the second gate line, the second data writing-in circuit writing the second data voltage to the control end of the second driving circuit, the second external compensation detecting circuit writing the voltage at the second end of the second driving circuit to the first external compensation line, the second data line outputting the fourth data voltage, under the control of the second gate line, the fourth data writing-in circuit writing the fourth data voltage to the control end of the fourth driving circuit, and the fourth external compensation detecting circuit writing the voltage at the second end of the fourth driving circuit to the second external compensation line;

in the external compensation control period, the third data line outputting a turn-off control voltage, and under the control of the second gate line, the sixth data writing-in circuit writing the turn-off control voltage to the control end of the sixth driving circuit to disconnect the first end and the second end of the sixth driving circuit.

17. A compensation control method of the display panel according to claim 8, comprising:

in an external compensation control period, the first data line outputting the second data voltage, and under the control of the second gate line, the second data writing-in circuit writing the second data voltage to the control end of the second driving circuit, the second external compensation detecting circuit writing the voltage at the second end of the second driving circuit to the first external compensation line, the third data line outputting the sixth data voltage, under the control of the second gate line, the sixth data writing-in circuit writing the sixth data voltage to the control end of the sixth driving circuit, and the sixth external compensation detecting circuit writing the voltage at the second end of the sixth driving circuit to the second external compensation line;

in the external compensation control period, the second data line outputting a turn-off control voltage, and under the control of the second gate line, the fourth data writing-in circuit writing the turn-off control voltage to the control end of the fourth driving circuit to disconnect the first end and the second end of the fourth driving circuit.

* * * * *